(12) United States Patent
Magzoub et al.

(10) Patent No.: US 11,034,874 B2
(45) Date of Patent: Jun. 15, 2021

(54) UTILIZATION OF STEEL-MAKING WASTE IN DRILLING FLUIDS FORMULATIONS

(71) Applicant: QATAR UNIVERSITY, Doha (QA)

(72) Inventors: Musaab I. Magzoub, Doha (QA); Muftah H. El-Naas, Doha (QA); Mustafa S. Nasser, Doha (QA)

(73) Assignee: QATAR UNIVERSITY, Doha (QA)

( * ) Notice: Subject to any disclaimer, the term of this patent is extended or adjusted under 35 U.S.C. 154(b) by 69 days.

(21) Appl. No.: 16/156,923

(22) Filed: Oct. 10, 2018

(65) Prior Publication Data

US 2020/0115610 A1 Apr. 16, 2020

(51) Int. Cl.
*C09K 8/16* (2006.01)
*E21B 21/00* (2006.01)

(52) U.S. Cl.
CPC ............... *C09K 8/16* (2013.01); *E21B 21/00* (2013.01)

(58) Field of Classification Search
None
See application file for complete search history.

(56) References Cited

U.S. PATENT DOCUMENTS

| | | | |
|---|---|---|---|
| 2,122,236 A | 6/1938 | Nichols | |
| 3,498,394 A | 3/1970 | Goodwin et al. | |
| 4,008,775 A | 2/1977 | Fox | |
| 4,246,243 A | 1/1981 | Fox | |
| 4,476,029 A | 10/1984 | Sy et al. | |
| 4,895,665 A * | 1/1990 | Colelli | B01D 21/01 175/66 |
| 5,341,882 A | 8/1994 | Hale | |
| 5,401,719 A | 3/1995 | DeBeer | |
| 2013/0312641 A1* | 11/2013 | Chatterji | C09K 8/473 106/672 |
| 2014/0083699 A1* | 3/2014 | Roddy | C09K 8/40 166/292 |
| 2014/0231145 A1 | 8/2014 | Kverel et al. | |

(Continued)

FOREIGN PATENT DOCUMENTS

WO WO 2014/181184 A2 11/2014
WO WO 2017/115219 A1 7/2017

OTHER PUBLICATIONS

American Petroleum Institute, "Purchasing Guidelines Handbook" API Specification 13A, 18th Edition, Aug. 2010; Specificatoin for Drilling Fluids—Specifications and Testing, 22 pages.

(Continued)

*Primary Examiner* — John J Figueroa
(74) *Attorney, Agent, or Firm* — Squire Patton Boggs (US) LLP

(57) ABSTRACT

The current invention relates to fluids used in well-bore applications. Embodiments of the present invention encompass fluids including, but not limited to including, a combination of solids and liquid, where the solids include, but not limited to including, clay and industrial dust, such as, but not limited to, steel dust, and methods of making and using such fluids. The liquid may be a combination of two or more liquids. The clay may be a combination of two or more clays. The liquid may include water. A mixture of industrial dust from different sources may be used. In some embodiments, the industrial dust is steel dust including, but not limited to including, calcium oxide.

20 Claims, 11 Drawing Sheets

(56) References Cited

U.S. PATENT DOCUMENTS

2017/0247598 A1* 8/2017 Kennedy .............. E21B 33/138

OTHER PUBLICATIONS

Antunano, et al., "Development of a combined solid and liquid wastes treatment integrated into a high purity ZnO hydrometallurgical production process from Waelz oxide", *Hydrometallurgy 2017*, vol. 173, pp. 250-257, Sep. 4, 2017.

Bouabidi, et al., "Steel-Making dust as a potential adsorbent for the removal of lead (II) from an aqueous solution", *Chemical Engineering Journal 2018*, vol. 334, pp. 837-844, Oct. 16, 2017.

Das, et al., "An overview of utilization of slag and sludge from steel industries", *Resources, Conservation and Recycling 2007*, vol. 50, pp. 40-57, Jul. 7, 2006.

Doronin, et al., "Commercial Methods of Recycling Dust from Steelmaking", *Metallurgist 2011*, vol. 54, No. 9-10, pp. 673-681.

El-Naas, et al., "CO2 sequestration using accelerated gas-solid carbonation of pre-treated EAF steel-making bag house dust", *Journal of Environmental Management 2015*, vol. 156, pp. 218-224, Apr. 4, 2015.

Fernandez, et al., "Stabilization of electrical Arc Furnace dustwith Low-Grace MgO Prior to Landfill", *Journal of Environmental Engineering 2003*, vol. 129, No. 3, pp. 275-279, Mar. 2003.

Giasin, et al., "An experimental study on drilling of unidirectional GLARE fibre metal laminates", *Composite Structures 2015*, Accepted Manuscript; 27 pages; DOI: http://dx.doi.org/10.1016/j.compstruct.2015.08.007.

Matino, et al., "Optimization of By-Products Reuse in the Steel Industry: Valorization of Secondary Resources with a Particular Attention on Their Pelletization", *Waste Biomass Valor 2017*, Original Paper, vol. 8, pp. 2569-2581, Nov. 14, 2016.

Pitcher, et al., "Analysis of drill head designs for dual-reciprocating drilling technique in planetary regoliths", *Advances in Space Research 2015*, vol. 56, pp. 1765-1776, Jul. 15, 2015.

Ross, et al., "The Minerals of Bentonite and Related Clays and their Physical Properties", *Journal of the American Ceramic Society 1926*, vol. 9, pp. 77-96.

Tan et al., "Chemical characteristics and source apportionment of PM2.5 in Lanzhou, China", *Science of the Total Environment 2017*, vol. 601-602, pp. 1743-1752, Jun. 10, 2017.

Zakharov, et al., "Innovative mud additives developed from industrial wastes", *Oil and Gas Journal 1994*, vol. 92, No. 51, Dec. 19, 1994 (abstract).

\* cited by examiner

UTILIZATION OF STEEL-MAKING WASTE IN DRILLING FLUIDS FORMULATIONS

FIELD

This invention relates to fluids used in borewell applications, such as but not limited to, borewell applications for oil and gas drilling.

BACKGROUND

Drilling of oil and gas wells requires circulation of viscous heavy fluids called drilling fluids or drilling mud, injected through the drill string and flushed out of the well. The mud circulation serves as hole cleaner by lifting rock cuttings, and provides a reasonable hydrostatic pressure to suppress formation overburden pressure and prevent formation fluids from flowing into the well while drilling. Other functions of the drilling fluid or drilling mud are to lubricate the drill and cool the drill bit and other areas of the drill. Aqueous based drilling fluids are the most favourable type. A typical drilling fluid is prepared by adding one or more special additives to a mixture of water and mineral clays (up to 80 wt % solids in water). About 50% of drilling cost is due to the drilling mud.

Less expensive drilling fluids are needed.

SUMMARY

Embodiments of the present invention encompass fluids including, but not limited to including, a combination of solids and liquid, where the solids include, but not limited to including, clay and industrial dust, such as, but not limited to, steel dust, and methods of making and using such fluids. The liquid may be a combination of two or more liquids. In some embodiments, the industrial dust is steel dust including, but not limited to including, calcium oxide.

DETAILED DESCRIPTION

DISCUSSION

Figure 1:
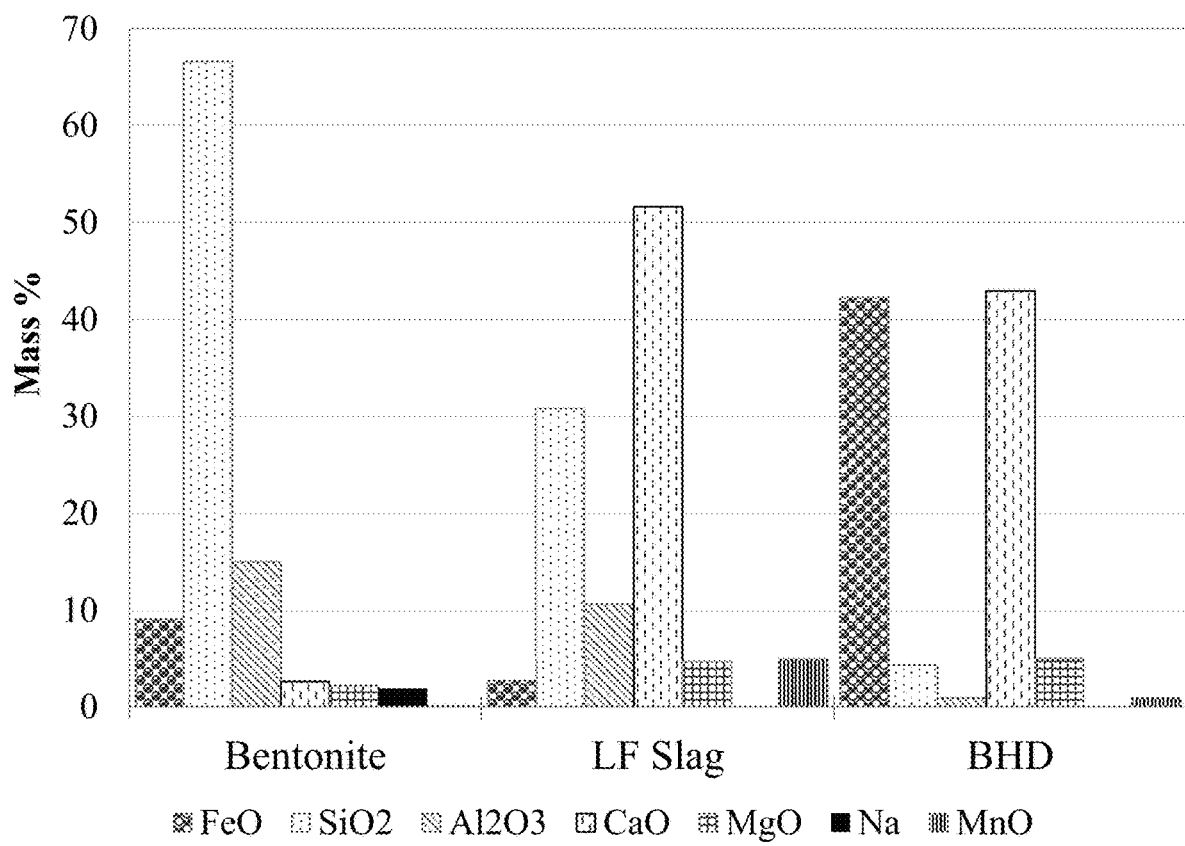
FIG. 1 is a bar chart of the XRD analysis of bentonite clay and several types of steel dust.

The phrase "as used herein" encompasses all of the specification, the abstract, the drawings (figures), and the claims.

Use of the singular herein includes the plural and vice versa unless expressly stated to be otherwise. That is, "a" and "the" refer to one or more of whatever the word modifies. For example, "a clay" may refer to one clay, two clays, etc. Likewise, "the oxide" may refer to one, two or more oxides and "the polymer" may mean one polymer or a plurality of polymers. By the same token, words such as, without limitation, "oxides" and "polymers" would refer to one oxide or polymer as well as to a plurality of oxides or polymers unless it is expressly stated or obvious from the context that such is not intended.

As used herein, the use of "preferred," "preferably," and "more preferred," and the like to modify an aspect of the invention refers to preferences as they existed at the time of filing of the patent application.

As used herein, "optional" means that the element modified by the term may or may not be present.

As used herein, the phrases "any combination of" and "a combination of" followed by a list joined by the conjunction "and," means any combination of two or more members of the group where the group members are the members of the list joined by the conjunction "and." As a non-limiting example, "any combination of A, B, C, and D" encompasses the following combinations: A and B; A and C; A and D; B and C; B and D; C and D; A, B, and C; A, B, and D; A, C, and D; B, C, and D; A, B, C, and D. Similarly, the phrase "A, B, C, D, or any combination thereof" encompasses an individual member (A, B, C, D) or any combination of A, B, C, and D, as outlined above. The phrase "A, B, C, D, or a combination thereof" encompasses an individual member (A, B, C, D) or any combination of A, B, C, and D, as outlined above. Similarly, the phrase "X is selected from the group consisting of A, B, C, D, and combinations thereof" (or a variant such as "X is selected from the group consisting of A, B, C, D, and all combinations thereof") encompasses X being an individual member of the group (A, B, C, D) or any combination of the A, B, C, and D, as outlined above. Although already encompassed by the description of singular and plural above, the terms "an individual member" and A will each be explicitly defined to encompass one or more members of A, if A is a genus, in the description above. Likewise, if B is a genus, "an individual member" and B each encompass one or more members of B in the above description, etc. As a non-limiting example, "halogen, OH, NH, CH$_3$, H, or any combination thereof" encompasses, but is not limited to encompassing, the following: I; Cl; NH; OH; Cl and F; Cl and OH; I, NH, H, and CH$_3$; I, Cl, and Br; I, F, and NH.

As used herein, the phrase "and/or" means a combination or an individual member. As a non-limiting example, "X is A, B, and/or C" encompasses the following possibilities: X is A; X is B; X is C; X is any combination of A, B, and C (A and B; A and C; B and C; A, B, and C). Although already encompassed by the description of singular and plural discussed above, it will be explicitly stated that if A is a genus, "an individual member" and A each encompass one or more members of A. Thus, as applied to the above non-limiting example, "X is A, B, and/or C" encompasses X is one or members of A; X is B; X is C; X is any combination of A, B, and C (B and one or more members of A; C and one or more members of A; B and C; B, C, and one or more members of A). In a likewise manner, "one or members of B" would apply if B were a genus, and the same for C, if C were a genus, etc.

As used herein, words of approximation such as, without limitation, "about," "substantially," "essentially," and "approximately" mean that the word or phrase modified by the term need not be exactly that which is written but may vary from that written description to some extent. The extent to which the description may vary will depend on how great a change can be instituted and have one of ordinary skill in the art recognize the modified version as still having the properties, characteristics and capabilities of the modified word or phrase. In general, but with the preceding discussion in mind, a numerical value herein that is modified by a word of approximation may vary from the stated value by ±10%, unless expressly stated otherwise.

As used herein, "wt %" is percent (%) by weight.

As used herein, any ranges presented are inclusive of the end-points. For example, "a temperature between 10° C. and 30° C." and "a temperature from 10° C. to 30° C." include 10° C. and 30° C., as well as any temperature in between.

As used herein, a range may be expressed as from "about" one particular value and/or to "about" another particular value. When such a range is expressed, another embodiment is included, the embodiment being from one particular value and/or to the other particular value. Similarly when values are expressed as approximations by use of the antecedent "about," it will be understood that the particular value forms another embodiment. As a non-limiting example, if "from about 1 to about 4" is disclosed, another embodiment is "from 1 to 4," even if not expressly disclosed. Likewise, if one embodiment disclosed is a temperature of "about 30° C.," then another embodiment is "30° C.," even if not expressly disclosed.

As used herein, a "polymer" refers to a molecule comprised of, actually or conceptually, repeating "constitutional units." The constitutional units derive from the reaction of monomers. As a non-limiting example, ethylene ($CH_2=CH_2$) is a monomer that can be polymerized to form polyethylene, $CH_3CH_2(CH_2CH_2)_nCH_2CH_3$ (where n is an integer), wherein the unit —$CH_2CH_2$— is repeated, ethylene having lost the double bond as the result of the polymerization reaction. As used herein, the term "constitutional unit" will refer to the smallest repeating unit (for example, —$CH_2$—, in the above example even though ethylene is what is reacted). The constitutional units themselves can be the product of the reactions of other compounds. A polymer may be derived from the polymerization of several different types of monomers and/or may be formed of several different types of constitutional units. Such polymers are referred to as "copolymers." Those skilled in the art, given a particular polymer, will readily recognize the constitutional units of that polymer and will equally readily recognize the structure of the monomer from which the constitutional units derive.

As used herein, the term polymer refers to a molecule comprising more than 20 constitutional units.

A polymer may be straight or branched chain, or it may be star-like or dendritic. One polymer may be attached (grafted) onto another. Polymers may have a random disposition of constitutional units along the chain, the constitutional units may be present as discrete blocks, or constitutional units may be so disposed as to form gradients of concentration along the polymer chain. In other words, the polymers used in this invention may be regular alternating polymers, random alternating polymers, regular block polymers, random block polymers or purely random polymers unless expressly noted otherwise. Polymers may be cross-linked to form a network.

As used herein, a molecule which has a chain length of 20 or fewer constitutional units is referred to as an "oligomer."

As used herein, "particle" is a piece of matter held together by physical bonding of molecules, an agglomeration of pieces of matter ("particles") held together by colloidal forces and/or surface forces, a piece of matter which is held together by chemical bonds such as a cross-linked polymer network, a piece of matter formed by ionic interactions, or a piece of matter held together by any combination of agglomeration, surface forces, colloidal forces, ionic interactions, and chemical bonds. For the purposes of this disclosure, a particle will be defined as ranging in size from less than one tenth of a nanometer to several centimeters in size.

The polydispersity of a plurality of particles represents the distribution of sizes, usually expressed as particle diameters, within a plurality of particles. The average diameter can be a number average diameter, where the number average diameter=$\Sigma_i d_i n_i / \Sigma_i$ where $n_i$ represents the number of particles with a diameter represented by $d_i$. Usually approximations are made and the distribution of particles by diameters is represented as a histogram, or in other words the particles are divided into smaller groups encompassing a smaller range of diameters and each of these groups is assigned a diameter near the center of that range. The surface area average diameter is determined by $(\Sigma_i f_i d_i^2)^{1/2}$, and the volume average diameter is determined by $(\Sigma_i f_i d_i^3)^{1/3}$, where $f_i$ is $n_i/\Sigma_i n_i$, and these averages are also referred to as D(3,2) and D(4,3), respectively. Thus, in the case of the surface area average, the weighting factor is the surface area represented by the class of particles of diameter $d_i$ while for the volume average diameter, the weighting factor is the volume represented by each class of particles of diameter $d_i$. Since the surface area increases with diameter squared and the volume increases with diameter cubed, the surface area average diameter is greater than the number average diameter. Likewise, the volume average diameter exceeds the surface area diameter. Similarly, distributions of particle sizes may be based on the number, surface area, or volume of the particles. As used herein, unless expressly stated otherwise or obvious from the context that another definition applies, any reference to the average diameter of a plurality of particles will refer to the volume average diameter.

The distribution of the particle sizes in a plurality may be represented by the standard deviation, which is a well-known statistical measurement. The standard deviation may be suitable for a narrow particle size distribution. Other measures of polydispersity include the d10 and d90 which refer to the diameters representing the intersection of the 10% line and the 90% line on a graph of the cumulative property versus particle size, that is the 10% line, where 10% of the distribution falls below, and 90% of the distribution falls below, respectively. The average may be referred to as a d50 (or $d_{50}$) where the 50% line intersects the cumulative a graph of the cumulative property versus particle size. As a non-limiting example, for a volume average diameter, the d50 represents the diameter at the intersection of the 50% line on a plot of the cumulative volume of the particles as a function of diameter of the particles. In other words, the d50 is the 50% percentile, also referred to as the median, and for a volume diameter, the d50 is where half the volume represented by the plurality of particles is in particles having a diameter smaller than d50.

As used herein, any weight percentages (wt %) or weight ratios disclosed also cover mass percentages or mass ratios even if not expressly stated.

Embodiments of the present invention are directed to a fluid including, but not limited to including, a combination of solids and liquid, the solids including, but not not limited to including, clay and industrial dust, and methods of making and using such fluids. The industrial dust may be a dust by-product of one or more industrial processes. In preferred embodiments, the industrial dust is steel dust, a by-product from a steel making process. The liquid may be one liquid or a combination of two or more liquids.

Bentonite clays, which are widely used to formulate water based drilling fluids, are aluminum silicates with presence of other ions such as $Na^+$, $Ca^+$, and $Mg^+$, as shown in the following formula:

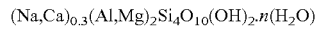

$$(Na,Ca)_{0.3}(Al,Mg)_2Si_4O_{10}(OH)_2.n(H_2O)$$

where (Na,Ca) mean Na, Ca, or a combination thereof and (Al, Mg) means Al, Mg, or a combination thereof, and n refers to an integer. Steel making by-product waste streams include calcium ions, magnesium ions, and aluminum silicates, in addition to oxides, in various combinations. Since these elements are highly favorable in drilling fluids, these steel-making by-product streams may be used as an additive to drilling fluids.

Industrial waste materials are widely available. As a non-limiting example, in the steel industry, the total production of crude steel increased recently to hundreds of million metric tons according to world steel association reports. The typical integrated steel plant produces about 90 to 100 kg of steel slag per ton of steel during the refining of hot metal from the blast furnace. This generates alkaline solid residues about 10 wt % to 15 wt % of the produced steel, depending on the characteristics of the manufacturing process. The utilization of steel-making waste as drilling fluid additives may not only reduce the cost of the drilling process for the oil and gas industry, but also contribute to solid waste management for the steel-making Industry.

It is desirable for a drilling fluid to be stable, that is suspended particles should stay suspended. The rheological properties of drilling fluids are important for controlling frictional pressure drop and solids-bearing capacity (for removal of drilling cuttings). Due to the need to circulate the drilling fluids, the viscosity is important. In addition, for preparation of drilling fluid in the well sites, high-speed mixers are used, and high shear rates are applied to formulate the mud and pump it into the well. Inside the well, the drilling fluid will also be subjected to the high shear applied by the rotation of the drilling string in addition to the shear resulting from different circulation speeds and pressures. Thus, it is desirable for a drilling fluid to have a suitably high viscosity and to exhibit pseudoplastic properties. A fluid with pseudoplastic properties does not flow unless the force or shear exceeds a particular value, typically referred to as the yield point. In addition, it is desirable for a drilling fluid to be non-Newtonian and to exhibit shear thinning behavior, that is the viscosity decreases as the shear rate increases.

Embodiments of the present invention encompass fluids including, but not limited to including, a combination of solids and liquid, where the solids include, but not limited to including, clay and industrial dust, such as, but not limited to, steel dust, and methods of making and using such fluids. The fluid includes a combination of solids and liquid where the solids include clay, industrial dust (such as but not limited to, steel dust), and optionally other additives. The fluid is a combination of solids with liquid where the solids are dissolved, partially dissolved, dispersed, or a combination thereof in the liquid. The liquid may be one or more liquids. As used herein, the "% solids" is the weight of solids added as a percent of the total weight.

In some embodiments, the liquid is water. In some embodiments, embodiments, the liquid is a combination of water and one or more other liquids. Water "as received" may include dissolved solids and/or other material. The dissolved solids and/or other material in the water, that are not specifically added, are not considered in calculating the "% solids" of the fluid discussed herein. In some embodiments, the one or more other liquids are miscible with water, the one or more other liquids are partially miscible with water, the one or more other liquids are immiscible with water, or a combination thereof. In some embodiments, one or more other liquids that are immiscible with water are present and are in the form of suspended droplets in the water. Non-limiting examples of the one or more other liquids, which may be used in addition to water or instead of water, are alcohols and silicones. Some non-limiting examples of alcohols are polyalcohols such as, but not limited to, glycerol, diglycerols, triglycerols, tetraglycerols, etc.

In some embodiments, the fluid includes water and one or more other liquids and the one or more other liquids are at least 0.000001 wt % of the total liquids, and not more than 60 wt %. In some embodiments, the one or more other liquids are at least 0.0001 wt % of the total liquids, and not more than 50 wt %. In some embodiments, the one or more other liquids are at least 0.005 wt % of the total liquids, and not more than 40 wt %. In some embodiments, the one or more other liquids are at least 0.01 wt % of the total liquids, and not more than 35 wt %. In some embodiments, the one or more other liquids are at least 0.01 wt % of the total liquids, and not more than 30 wt %. In some embodiments, the one or more other liquids are at least 0.01 wt % of the total liquids, and not more than 25 wt %. In some embodiments, the one or more other liquids are at least 0.01 wt % of the total liquids, and not more than 20 wt %. In some embodiments, the one or more other liquids are at least 0.01 wt % of the total liquids, and not more than 15 wt %. In some embodiments, the one or more other liquids are at least 0.01 wt % of the total liquids, and not more than 10 wt %. In some embodiments, the one or more other liquids are at least 2 wt % of the total liquids, and not more than 50 wt %. In some embodiments, the one or more other liquids are at least 4 wt % of the total liquids, and not more than 50 wt %. In some embodiments, the one or more other liquids are at least 2 wt % of the total liquids, and not more than 25 wt %. In some embodiments, the one or more other liquids are at least 4 wt % of the total liquids, and not more than 20 wt %. In some embodiments, the one or more other liquids are at least 5 wt % of the total liquids, and not more than 35 wt %. It is understood that a limitation of "not more than 40 wt %" inherently also meets the not more than 50 wt % and not more than 60 wt % limitations, etc.

In preferred embodiments, water or a combination of water and one or more liquids, the liquids being miscible, or at least partially miscible, with water, forms a continuous phase of the fluid. In some embodiments, the water is potable water and/or tap water. In some embodiments, the water is process water and/or treated process water. As used herein, "process water" is the water from another process. In some embodiments, the water is seawater and/or water from a lake, stream, and/or river.

In some embodiments of the present invention, the % solids in the fluid including, but not limited to including, a combination of solids and liquid, the solids including, but not not limited to including, clay and industrial dust, such as but not limited to, steel dust, is in the range of 0.25 wt % to 80 wt %. In some embodiments, the % solids in the fluid of the embodiments of the present invention is in the range of 0.25 wt % to 65 wt %. In some embodiments, the % solids in the fluid of the embodiments of the present invention is in the range of 0.25 wt % to 60 wt %. In some embodiments, the % solids in the fluid of the embodiments of the present invention is in the range of 0.25 wt % to 55 wt %. In some embodiments, the % solids in the fluid of the embodiments of the present invention is in the range of 0.25 wt % to 50 wt %. In some embodiments, the % solids in the fluid of the embodiments of the present invention is in the range of 0.25 wt % to 45 wt %. In some embodiments, the % solids in the fluid of the embodiments of the present invention is in the range of 0.25 wt % to 40 wt %. In some embodiments, the % solids in the fluid of the embodiments of the present invention is in the range of 0.25 wt % to 35 wt %. In some embodiments, the % solids in the fluid of the embodiments of the present invention is in the range of 0.25 wt % to 30 wt %. In some embodiments, the % solids in the fluid of the embodiments of the present invention is in the range of 0.25 wt % to 25 wt %. In some embodiments, the % solids in the fluid of the embodiments of the present invention is in the range of 0.25 wt % to 20 wt %. In some embodiments, the % solids in the fluid of the embodiments of the present invention is in the range of 0.1 wt % to 20 wt %. In some embodiments, the % solids in the fluid of the embodiments of the present invention is in the range of 0.1 wt % to 18 wt %. In some embodiments, the % solids in the fluid of the embodiments of the present invention is in the range of 0.2 wt % to 16 wt %. In some embodiments, the % solids in the fluid of the embodiments of the present invention is in the range of 0.2 wt % to 15 wt %. In some embodiments, the % solids in the fluid of the embodiments of the present invention is in the range of 0.2 wt % to 12 wt %. In some embodiments, the % solids in the fluid of the embodiments of the present invention is in the range of 0.2 wt % to 10 wt %. In some embodiments, the % solids in the fluid of the embodiments of the present invention is in the range of 0.5 wt % to 8 wt %.

The clay of the fluid of the embodiments of the present invention may be any type of clay (or combination thereof), and preferably, a clay (or combination thereof) which is typically used in drilling fluids. In the embodiments of the present invention, the clays may be used individually, or in combination with other clays including, but not limited to, the clays described herein. In some embodiments of the present invention, preferred clays are bentonite. Bentonite clays may be classified as medium yield bentonite clay or high yield bentonite clay. The term "yield" is a term of art and defines the quality of a clay by the number of barrels of a given viscosity (measured in centipoise) slurry that can be made from a ton of the clay. Bentonite clays may include a number of counter ions including sodium, calcium, magnesium, and others. Bentonite clays with predominantly calcium counter ions are often referred to as "calcium bentonite" and bentonite clays with predominantly sodium counter ions are often referred to "sodium bentonite." Bentonite clays that may be used in embodiments of the present invention include clays with any counter ions and including any combination of counter ions.

In some embodiments of the present invention, the volume average particle diameter of the clay added is in the range of 1-20 In some embodiments of the present invention, the volume average particle diameter of the clay added is in the range of 2-16 In some embodiments of the present invention, the volume average particle diameter of the clay added is in the range of 4-13 In some embodiments of the present invention, the volume average particle diameter of the clay added is in the range of 5-12 In some embodiments, the above volume average particle diameter refers to at least one of the one or more clays of the fluid. In some embodiments, the above volume average particle diameter refers to the combination of clays as added to the fluid.

Any industrial dust may be used as an additive to drilling fluids. In preferred embodiments, the industrial dust is a by-product waste stream. Industrial dust from a specific source may be used individually or in combination with industrial dust from one or more other sources, including, but not limited to including, industrial dust from sources as described herein. In some embodiments, industrial waste is ground to make a dust that is used in the embodiments of the present invention. In preferred embodiments, the industrial dust is steel dust from a steel making process. Three types of steel dust that may be used as an additive to a drilling fluid are Ladle Furnace (LF) slag, Baghouse dust (BHD) and Cyclone silo dust. For use as a drilling fluid additive, baghouse dust (BHD) is preferred.

In the following discussion of the embodiments of the present invention reference may be made to steel dust, but embodiments of the invention are not so limited. The various embodiments of the invention encompass steel dust as well as dust from other sources instead of or in addition to steel dust. The various embodiments of the invention specifically encompass industrial dust from other sources instead of or in addition to steel dust. In some embodiments, the dust includes, but is not limited to including, other metals instead of or in addition to iron. The steel dust may be a combination of different types of steel dust, such as and without limitation, a combination of baghouse dust and cyclone silo dust. In some embodiments, the steel dust includes, but is not limited to including, calcium oxide, that is also known as lime. In some embodiments, at least 10 wt % of the steel dust is calcium oxide. In some embodiments, at least 15 wt % of the steel dust is calcium oxide. In some embodiments, at least 20 wt % of the steel dust is calcium oxide. In some embodiments, at least 25 wt % of the steel dust is calcium oxide. In some embodiments, at least 30 wt % of the steel dust is calcium oxide. In some embodiments, at least 35 wt % of the steel dust is calcium oxide. In some embodiments, the steel dust includes, but is not limited to including, calcium and/or compounds including calcium. Non-limiting examples of compounds including calcium are calcium oxide and calcium carbonate. In some embodiments, at least 10 wt % of the steel dust is calcium and/or compounds including calcium. In some embodiments, at least 15 wt % of the steel dust is calcium and/or compounds including calcium. In some embodiments, at least 20 wt % of the steel dust is calcium and/or compounds including calcium. In some embodiments, at least 25 wt % of the steel dust is calcium and/or compounds including calcium. In some embodiments, at least 30 wt % of the steel dust is calcium and/or compounds including calcium. In some embodiments, at least 35 wt % of the steel dust is calcium and/or compounds including calcium.

In some embodiments, the steel dust comprises iron, one or more oxides of iron, or a combination thereof. Non-limiting examples of iron oxides include, but are not limited to, $FeO$, $Fe_2O_3$, and $Fe_3O_4$, that is $FeO.Fe_2O_3$. Other compounds including iron may also be present. In some embodiments, the sum of the wt % iron and the wt % oxides of iron present in the steel dust is at least 20 wt % of the steel dust, and not more than 100 wt %. Obviously, if only oxides of iron are present, then the sum of the wt % iron and the wt % oxides of iron is equivalent to the wt % oxides of iron, that includes all oxides of iron. Similarly, if iron is present, but no oxides of iron are present, then the sum of the wt % iron and the wt % oxides of iron of iron is equal to the wt % iron. In some embodiments, the sum of the wt % iron and the wt % oxides of iron present in the steel dust is at least 25 wt % of the steel dust. In some embodiments, the sum of the wt % iron and the wt % oxides of iron present in the steel dust is at least 30 wt % of the steel dust. In some embodiments, the sum of the wt % iron and the wt % oxides of iron present in the steel dust is at least 35 wt %. In some embodiments, the sum of the wt % iron and the wt % oxides of iron present in the steel dust is at least 40 wt % of the steel dust. In some embodiments, the sum of the wt % iron and the wt % oxides of iron present in the steel dust is at least 45 wt % of the steel dust. In some embodiments, the sum of the wt % iron and the wt % oxides of iron present in the steel dust is at least 50 wt % of the steel dust. In some embodiments, the sum of the wt % iron and the wt % oxides of iron present in the steel dust is at least 55 wt % of the steel dust. In some embodiments, the sum of the wt % iron and the wt % oxides of iron present in the steel dust is at least 60 wt % of the steel dust.

In some embodiments, the sum of the wt % iron and the wt % compounds including iron present in the steel dust is at least 20 wt % of the steel dust, and not more than 100 wt %. Compounds including iron include oxides of iron as well as other compounds including iron. Obviously, if only compounds including iron are present, then the sum of the wt % iron and the wt % compounds including iron is equivalent to the wt % compounds including iron, that includes all compounds including iron. Similarly, if iron is present, but no compounds including iron are present, then the sum of the wt % iron and the wt % compounds including iron is equal to the wt % iron. In some embodiments, the sum of the wt % iron and the wt % compounds including iron present in the steel dust is at least 25 wt % of the steel dust. In some embodiments, the sum of the wt % iron and the wt % compounds including iron present in the steel dust is at least 30 wt % of the steel dust. In some embodiments, the sum of the wt % iron and the wt % compounds including iron present in the steel dust is at least 35 wt %. In some embodiments, the sum of the wt % iron and the wt % compounds including iron present in the steel dust is at least 40 wt % of the steel dust. In some embodiments, the sum of the wt % iron and the wt % compounds including iron present in the steel dust is at least 45 wt % of the steel dust. In some embodiments, the sum of the wt % iron and the wt % compounds including iron present in the steel dust is at least 50 wt % of the steel dust. In some embodiments, the sum of the wt % iron and the wt % compounds including iron present in the steel dust is at least 55 wt % of the steel dust. In some embodiments, the sum of the wt % iron and the wt % compounds including iron present in the steel dust is at least 60 wt % of the steel dust.

In some embodiments, the steel dust includes, but is not limited to including, both calcium oxide, and iron, one or more iron oxides, or both iron and one or more oxides of iron. In some embodiments, the sum of the wt % calcium oxide, wt % iron, and the wt % oxides of iron is at least 50 wt % of the steel dust. Obviously, if only oxides of iron are present, then the wt % iron is zero, for this calculation (In other words, the iron in an oxide of iron is not double-counted since the total composition of the steel dust is 100 wt %). In some embodiments, the sum of the wt % of the calcium oxide, wt % of iron, and the wt % of the oxides of iron is at least 55 wt % of the steel dust. In some embodiments, the sum of the wt % calcium oxide, wt % iron, and the wt % oxides of iron is at least 60 wt % of the steel dust. In some embodiments, the sum of the wt % calcium oxide, wt % iron, and the wt % oxides of iron is at least 65 wt % of the steel dust. In some embodiments, the sum of the wt % calcium oxide, wt % iron, and the wt % oxides of iron is at least 70 wt % of the steel dust. In some embodiments, the sum of the wt % calcium oxide, wt % iron, and the wt % oxides of iron is at least 75 wt % of the steel dust. In some embodiments, the sum of the wt % calcium oxide, wt % iron, and the wt % oxides of iron is at least 80 wt % of the steel dust. In some embodiments, the sum of the wt % calcium oxide, wt % iron, and the wt % oxides of iron is at least 85 wt % of the steel dust. In some embodiments, sum of the wt % calcium oxide, wt % iron, and the wt % oxides of iron is at least 90 wt % of the steel dust. In some embodiments, the sum of the wt % calcium oxide, wt % iron, and the wt % oxides of iron is at least 92 wt % of the steel dust. In some embodiments, the sum of the wt % calcium oxide, wt % iron, and the wt % oxides of iron is at least 95 wt % of the steel dust. In some embodiments, the sum of the wt % calcium oxide, wt % iron, and the wt % oxides of iron is at least 97 wt % of the steel dust. In some embodiments, the sum of the wt % calcium oxide, wt % iron, and the wt % oxides of iron is at least 98 wt % of the steel dust. In some embodiments, the sum of the wt % calcium oxide, wt % iron, and the wt % oxides of iron is at least 99 wt % of the steel dust.

In some embodiments, the sum of the wt % calcium, wt % calcium compounds, wt % iron, and wt % iron compounds is at least 50 wt % of the steel dust. Obviously, if only oxides of iron are present, then the wt % iron, for this calculation, is zero, and if only calcium compounds are present, then the wt % calcium, for this calculation, is zero. In some embodiments, the sum of the wt % calcium, wt % calcium compounds, wt % iron, and wt % iron compounds is at least 55 wt % of the steel dust. In some embodiments, the sum of the wt % calcium, wt % of calcium compounds, wt % of iron, and wt % of iron compounds is at least 60 wt % of the steel dust. In some embodiments, the sum of the wt % calcium, wt % of calcium compounds, wt % of iron, and wt % of iron compounds is at least 65 wt % of the steel dust. In some embodiments, the sum of the wt % calcium, wt % of calcium compounds, wt % of iron, and wt % of iron compounds is at least 70 wt % of the steel dust. In some embodiments, the sum of the wt % calcium, wt % of calcium compounds, wt % of iron, and wt % of iron compounds is at least 75 wt % of the steel dust. In some embodiments, the sum of the wt % calcium, wt % of calcium compounds, wt % of iron, and wt % of iron compounds is at least 80 wt % of the steel dust. In some embodiments, the sum of the wt % calcium, wt % of calcium compounds, wt % of iron, and wt % of iron compounds is at least 85 wt % of the steel dust. In some embodiments, the sum of the wt % calcium, wt % of calcium compounds, wt % of iron, and wt % of iron compounds is at least 90 wt % of the steel dust. In some embodiments, the sum of the wt % calcium, wt % of calcium compounds, wt % of iron, and wt % of iron compounds is at least 92 wt % of the steel dust. In some embodiments, the sum of the wt % calcium, wt % of calcium compounds, wt % of iron, and wt % of iron compounds is at least 95 wt % of the steel dust. In some embodiments, the sum of the wt % calcium, wt % of calcium compounds, wt % of iron, and wt % of iron compounds is at least 97 wt % of the steel dust. In some embodiments, the sum of the wt % calcium, wt % of calcium compounds, wt % of iron, and wt % of iron compounds is at least 98 wt % of the steel dust. In some embodiments, the sum of the wt % calcium, wt % of calcium compounds, wt % of iron, and wt % of iron compounds is at least 99 wt % of the steel dust.

In some embodiments, the zeta potential of the steel dust is an important parameter. In some embodiments, the fluid includes, but is not limited to including, a steel dust where the zeta potential of the steel dust at 150 mg/liter in distilled water is less than −15 mV (more negative) at a pH in the range of 8 to 11. In some embodiments, the fluid includes, but is not limited to including, a steel dust where the zeta potential of the steel dust at 150 mg/liter in distilled water is less than −20 mV (more negative) at a pH in the range of 9 to 11. In some embodiments, the fluid includes, but is not limited to including, a steel dust where the zeta potential of the steel dust at 150 mg/liter in distilled water is less than −30 mV (more negative) at a pH in the range of 10 to 11. In some embodiments, the zeta potential of the steel dust is measured with a Zetasizer ZEN3600, from Malvern Instruments Ltd., UK, in which the 150 ppm (mg/liter) suspension sample is filtered using 0.45 μm pore-sized filters and tested at room temperature.

The turbidity of the steel dust may be used as a measure of the stability of the steel dust, that is the ability of the steel dust to be dispersed in liquid such as, but not limited to, water. In some embodiments, the fluid includes, but is not limited to including, a steel dust where the turbidity of the steel dust at 150 mg/liter in distilled water is at least 140 NTU when the pH is in the range of 4 to 11. In some embodiments, the fluid includes, but is not limited to including, a steel dust where the turbidity of the steel dust at 150 mg/liter in distilled water is at least 150 NTU when the pH is in the range of 7 to 11. In some embodiments, the fluid includes, but is not limited to including, a steel dust where the turbidity of the steel dust at 150 mg/liter in distilled water is at least 160 NTU when the pH is in the range of 8 to 11. In some embodiments, the turbidity of the steel dust is measured with a Hach 2100N turbidity meter, the turbidity of 150 ppm (mg/liter) suspension of each sample being measured in Nephelometric Turbidity Units (NTU).

In some embodiments, the fluid includes, but is not limited to including, a steel dust for which the weight to weight ratio of the calcium oxide to the iron, one or more oxides of iron, or both iron and one or more oxides of iron (in other words, weight calcium oxide: {Σ weight iron+ weight of all oxides of iron}) is in the range of 1:9 to 9:1. In some embodiments, the fluid includes, but is not limited to including, a steel dust for which the weight to weight ratio of the calcium oxide to the iron, one or more oxides of iron, or both iron and one or more oxides of iron is in the range of 2:8 to 8:2. In some embodiments, the fluid includes, but is not limited to including, a steel dust for which the weight to weight ratio of the calcium oxide to the iron, one or more oxides of iron, or both iron and one or more oxides of iron is in the range of 3:7 to 7:3. In some embodiments, the fluid includes, but is not limited to including, a steel dust for which the weight to weight ratio of the calcium oxide to the iron, one or more oxides of iron, or both iron and one or more oxides of iron is in the range of 1:3 to 3:1. In some embodiments, the fluid includes, but is not limited to including, a steel dust for which the weight to weight ratio of the calcium oxide to the iron, one or more oxides of iron, or both iron and one or more oxides of iron is in the range of 2:3 to 3:2. In some embodiments, the fluid includes, but is not limited to including, a steel dust for which the weight to weight ratio of the calcium oxide to the iron, one or more oxides of iron, or both iron and one or more oxides of iron is in the range of 3:4 to 4:3. In some embodiments, the fluid includes, but is not limited to including, a steel dust for which the weight to weight ratio of the calcium oxide to the iron, one or more oxides of iron, or both iron and one or more oxides of iron is in the range of 4:5 to 5:4. In some embodiments, the fluid includes, but is not limited to including, a steel dust for which the weight to weight ratio of the calcium oxide to the iron, one or more oxides of iron, or both iron and one or more oxides of iron is in the range of 9:11 to 11:9.

In some embodiments, the particle size and/or particle size distribution of the steel dust is a significant parameter used in selecting the steel dust. In some embodiments, the volume average particle diameter of the steel dust added is in the range of 10-30 In some embodiments, the volume average particle diameter of the steel dust added is in the range of 12-27 In some embodiments, the volume average particle diameter of the steel dust added is in the range of 15-25 In some embodiments, the volume average particle diameter of the steel dust added is in the range of 17-23 In some embodiments, the average particle diameter is determined using a Mastersizer 3000 (Malvern Instruments Ltd., UK), by wet dispersion method, and this measurement is a laser diffraction method that provides a volume average diameter (D(4,3)).

Embodiments of the present invention encompass fluids including, but not limited to including, a combination of solids and liquid, where the solids include, but not limited to including, clay and industrial dust, such as but not limited to, steel dust, and methods of making and using such fluids. In some embodiments, the solids of the fluid consists of steel dust and clay, where the steel dust can be one or more sources or types of steel dust and the clay may be one or more types of clay. In some embodiments, the sum of the wt % clay and the wt % steel dust is at least 50 wt % of the solids. In some embodiments, the sum of the wt % clay and the wt % steel dust is at least 55 wt % of the solids. In some embodiments, the sum of the wt % clay and the wt % steel dust is at least 60 wt % of the solids. In some embodiments, the sum of the wt % clay and the wt % steel dust is at least 65 wt % of the solids. In some embodiments, the sum of the wt % clay and the wt % steel dust is at least 70 wt % of the solids. In some embodiments, the sum of the wt % clay and the wt % steel dust is at least 75 wt % of the solids. In some embodiments, the sum of the wt % clay and the wt % steel dust is at least 80 wt % of the solids. In some embodiments, the sum of the wt % clay and the wt % steel dust is at least 85 wt % of the solids. In some embodiments, the sum of the wt % clay and the wt % steel dust is at least 90 wt % of the solids. In some embodiments, the sum of the wt % clay and the wt % steel dust is at least 95 wt % of the solids. In some embodiments, the sum of the wt % clay and the wt % steel dust is at least 96 wt % of the solids. In some embodiments, the sum of the wt % clay and the wt % steel dust is at least 97 wt % of the solids. In some embodiments, the sum of the wt % clay and the wt % steel dust is at least 97.5 wt % of the solids. In some embodiments, the sum of the wt % clay and the wt % steel dust is at least 98 wt % of the solids. In some embodiments, the sum of the wt % clay and the wt % steel dust is at least 98.5 wt % of the solids. In some embodiments, the sum of the wt % clay and the wt % steel dust is at least 99 wt % of the solids. In some embodiments, the sum of the wt % clay and the wt % steel dust is at least 99.5 wt % of the solids. In some embodiments, the sum of the wt % clay and the wt % steel dust is at least 99.8 wt % of the solids. Obviously, the maximum of sum of the wt % clay and the wt % steel dust is 100 wt % of the solids of the fluid of the embodiments of the present invention.

In the embodiments of the present invention, the weight to weight ratio of steel dust to clay (ratio of the sum of all steel dust and/or industrial dust to the sum of all clays) may be within a broad range. In some embodiments of the present invention, the weight to weight ratio of steel dust to clay is in the range of 1:1000 to 10:1. In some embodiments of the present invention, the weight to weight ratio of steel dust to clay is in the range of 1:500 to 9:1. In some embodiments of the present invention, the weight to weight ratio of steel dust to clay is in the range of 1:450 to 8:1. In some embodiments of the present invention, the weight to weight ratio of steel dust to clay is in the range of 1:400 to 8:1. In some embodiments of the present invention, the weight to weight ratio of steel dust to clay is in the range of 1:300 to 5:1. In some embodiments of the present invention, the weight to weight ratio of steel dust to clay is in the range of 1:200 to 2:1. In some embodiments of the present invention, the weight to weight ratio of steel dust to clay is in the range of 1:1000 to 1:1. In some embodiments of the present invention, the weight to weight ratio of steel dust to clay is in the range of 1:200 to 1:3. In some embodiments of the present invention, the weight to weight ratio of steel dust to clay is in the range of 1:200 to 1:2. In some embodiments of the present invention, the weight to weight ratio of steel dust to clay is in the range of 1:200 to 9:20. In some embodiments of the present invention, the weight to weight ratio of steel dust to clay is in the range of 1:200 to 6:13. In some embodiments of the present invention, the weight to weight ratio of steel dust to clay is in the range of 1:200 to 16:35. In some embodiments of the present invention, the weight to weight ratio of steel dust to clay is in the range of 1:200 to 7:20. In some embodiments of the present invention, the weight to weight ratio of steel dust to clay is in the range of 1:1000 to 1:100 to 1:4. In some embodiments of the present invention, the weight to weight ratio of steel dust to clay is in the range of 1:200 to 3:8. In some embodiments of the present invention, the weight to weight ratio of steel dust to clay is in the range of 1:200 to 3:11. In some embodiments of the present invention, the weight to weight ratio of steel dust to clay is in the range of 1:12 to 2:9. In preferred embodiments, the weight to weight ratio of steel dust to clay is 1:4 and within 10% of 1:4.

Embodiments of the present invention encompass fluids including, but not limited to including, a combination of solids and liquid, where the solids include, but not limited to including, clay and industrial dust, such as, but not limited to, steel dust, and methods of making and using such fluids, where one or more other materials may be added to the one or more fluids in addition to the industrial dust and clay. In some embodiments, the other materials are solid. In some embodiments, the other materials are liquid and are encompassed in the one or more liquids. Non-limiting examples of additives that may be used, individually, or in combination with one or more other additives, including, but not limited to including, those described herein, are salts, surfactants, dispersants (deflocculants), viscosity modifiers (rheology control agents), fluid loss additives, shale stabilizers, and weighting materials. Some non-limiting examples of specific additives are starches, carboxymethyl cellulose, xanthan gum, and silicones. Some non-limiting examples of weighting materials are iron, iron oxide, or barite, that are mineral forms of $BaSO_4$. Non-limiting examples of salts which may be added and/or may be present in the liquid are NaCl, NaBr, KCl, $CaCl_2$, $NaNO_3$, $NaC_2H_3O_2$, $KC_2H_3O_2$, $NaCHO_2$, $CsCHO_2$, and $KCHO_2$. Some additives may fall into more than one category.

Embodiments of the present invention encompass fluids including, but not limited to including, a combination of solids and liquid, where the solids include, but are not limited to including, clay and industrial dust, such as, but not limited to, steel dust, and methods of making and using such fluids, where the apparent viscosity of the fluid is at least 30 cP. The apparent viscosity is determined using a Fan viscometer (Direct-indicating viscometer FAN-35). In some embodiments, the apparent viscosity of the fluid is at least 32 cP. In some embodiments, the apparent viscosity of the fluid is at least 36 cP. In some embodiments, the apparent viscosity of the fluid is at least 38 cP. In some embodiments, the apparent viscosity of the fluid is at least 40 cP. In some embodiments, the apparent viscosity of the fluid is at least 42 cP.

Embodiments of the present invention encompass fluids including, but not limited to including, a combination of solids and liquid, where the solids include, but are not limited to including, clay and industrial dust, such as, but not limited to, steel dust, and methods of making and using such fluids, where the plastic viscosity of the fluid is not more than 22 cP. The plastic viscosity is determined by Fan viscometer (Direct-indicating viscometer FAN-35) following API (American Petroleum Institute) standard procedures. In some embodiments, the plastic viscosity of the fluid is not more than 20 cP. In some embodiments, the plastic viscosity of the fluid is not more than 18 cP. In some embodiments, the plastic viscosity of the fluid is not more than 16 cP. In some embodiments, the plastic viscosity of the fluid is not more than 14 cP. In some embodiments, the plastic viscosity of the fluid is not more than 12 cP.

Embodiments of the present invention encompass fluids including, but not limited to including, a combination of solids and liquid, where the solids include, but are not limited to including, clay and industrial dust, such as, but not limited to, steel dust, and methods of making and using such fluids, where the yield point of the fluid is at least 25 lb/100 $ft^2$. In some embodiments, the yield point of the fluid is at least 30 lb/100 $ft^2$. In some embodiments, the yield point of the fluid is at least 32 lb/100 $ft^2$. In some embodiments, the yield point of the fluid is at least 35 lb/100 $ft^2$. In some embodiments, the yield point of the fluid is at least 40 lb/100 $ft^2$. In some embodiments, the yield point of the fluid is at least 45 lb/100 $ft^2$. In some embodiments, the yield point of the fluid is at least 50 lb/100 $ft^2$. In some embodiments, the yield point of the fluid is at least 55 lb/100 $ft^2$. In some embodiments, the yield point of the fluid is at least 60 lb/100 $ft^2$. In some embodiments, the yield point of the fluid is at least 62 lb/100 $ft^2$.

Embodiments of the present invention encompass fluids including, but not limited to including, a combination of solids and liquid, where the solids include, but not limited to including, clay and industrial dust, such as, but not limited to, steel dust, and methods of making and using such fluids, where the fluid exhibits a filtration of at least 15 ml in the API filtration test. The API (American Petroleum Institute) filtration test measures the amount of mud invasion into the permeable formation and the filter cake that will form on the wall of the wellbore when filtration takes place.

In some embodiments, the fluid exhibits a filtration of at least 16 ml filtration in the API filtration test. In some embodiments, the fluid exhibits a filtration of at least 17 ml filtration in the API filtration test. In some embodiments, the fluid exhibits a filtration of at least 18 ml filtration in the API filtration test. In some embodiments, the fluid exhibits a filtration of at least 19 ml filtration in the API filtration test. In some embodiments, the fluid exhibits a filtration of at least 20 ml filtration in the API filtration test. In some embodiments, the fluid exhibits a filtration of at least 21 ml filtration in the API filtration test. In some embodiments, the fluid exhibits a filtration of at least 22 ml filtration in the API filtration test. In some embodiments, the fluid exhibits a filtration of at least 23 ml filtration in the API filtration test. In some embodiments, the fluid exhibits a filtration of at least 24 ml filtration in the API filtration test. In some embodiments, the fluid exhibits a filtration of at least 25 ml filtration in the API filtration test. In some embodiments, the fluid exhibits a filtration of at least 30 ml filtration in the API filtration test.

Embodiments of the present invention encompass fluids including, but not limited to including, a combination of solids and liquid, where the solids include, but are not limited to including, clay and industrial dust (such as, but not limited to, steel dust), and methods of using such fluids, and methods of making such fluids, where the methods include, but not limited to including, forming a combination of the liquid and the solids. Embodiments of the present invention encompass methods of making the fluids where the liquid and solids are combined in any order. However, it has been found that the fluid formed has better properties, that is a more stable suspension stability and a higher viscosity, when the clay is combined with liquid first. In some embodiments, the clay is combined with liquid, and then the steel dust and/or a composition including steel dust is combined with the combination of the clay and the liquid. In some embodiments, at least 60 seconds passes after the clay and liquid are combined and before the addition of the steel dust and/or composition including steel dust.

In some embodiments, a dispersion of clay in liquid is formed, and then the steel dust and/or a composition including steel dust is added to the clay dispersion and mixed and/or blended to be substantially homogenous (visually appears consistent and/or not more than 15% variation in the distribution of the steel dust). In forming the dispersion of clay in liquid, the clay and liquid may be added in any order. The clay may be added to one liquid, or may be added to two or more liquids that have already been combined, and the clay and liquid blended to form a dispersion, and optionally additional liquid may be added during and/or after the addition of the clay, and/or during and/or after blending the clay and liquid. If additional liquid is added during and/or after the addition of the clay, and/or during and/or after the blending of clay and liquid, the additional liquid may be the same or different, where different encompasses at least one different liquid being added and/or different proportions of the same two or more liquids are added. In some embodiments, after the dispersion of clay in liquid is formed, there is a time period of at least 15 seconds and not more than 1 hour to allow for hydration before the steel dust and/or a composition including steel dust is added to the dispersion. In some embodiments, the time period after the dispersion of clay in liquid is formed, but before the steel dust and/or a composition including steel dust is added to the dispersion, is in the range of 30 seconds to 10 minutes. In some embodiments, the time period after the dispersion of clay in liquid is formed, but before the steel dust and/or a composition including steel dust is added to the dispersion, is in the range of 2 minutes to 30 minutes. In some embodiments, the time period after the dispersion of clay in liquid is formed, but before the steel dust and/or a composition including steel dust is added to the dispersion, is in the range of 5 minutes to 20 minutes. In some embodiments, the time period after the dispersion of clay in liquid is formed, but before the steel dust and/or a composition including steel dust is added to the dispersion, is not less than 5 minutes and not more than 25 minutes. The composition including steel dust may be steel dust and one or more solids, steel dust and liquid, or steel dust, and one or more solids and liquid; where the liquid may be the same as or different from the liquid of the clay dispersion, and where different encompasses at least one different liquid being added and/or different proportions of the same two or more liquids are added. As a non-limiting example, clay may be dispersed in a combination of water and an alcohol and a dispersion of steel dust in water may be subsequently added to the clay dispersion. In the embodiments of the present invention described herein, it is understood that the clay may be one or more clays, and the one or more clays may be added in any order.

Embodiments of the present invention encompass methods including, but not limited to including: forming a blend comprising clay and liquid; after forming the blend comprising clay and liquid, adding steel dust and/or a composition comprising steel dust to the blend comprising the clay and the liquid; after adding the steel dust and/or the composition comprising steel dust, mixing the blend with the added steel dust for a time period (first time period) to form the fluid; after the first time period, optionally aging the fluid comprising the clay, steel dust, and the liquid for a time period (second time period); and after the second time period, optionally mixing the fluid comprising the clay, steel dust, and the liquid for a time period (third time period). In some embodiments, the blend of the clay and liquid is a dispersion of the clay in the liquid. In the embodiments of the present invention described herein, it is understood that the liquid may be one or more liquids, and the one or more liquids may be added in any order.

In some embodiments, the first time period is in the range of 5 seconds to 360 minutes. In some embodiments, the first time period is in the range of 10 seconds to 120 minutes. In some embodiments, the first time period is in the range of 15 seconds to 100 minutes. In some embodiments, the first time period is in the range of 30 seconds to 60 minutes. In some embodiments, the first time period is in the range of 30 seconds to 360 minutes. In some embodiments, the first time period is in the range of 30 seconds to 45 minutes. In some embodiments, the first time period is in the range of 5 minutes seconds to 35 minutes.

In some embodiments, aging is allowing the blend to sit quiescently at a temperature in the range of 19° C. to 25° C. and a pressure of 1013.25 mbar (±150 mbar). In some embodiments, the second time period is in the range of 0.1 hour to 72 hours. In some embodiments, the second time period is in the range of 0.2 hour to 48 hours. In some embodiments, the second time period is in the range of 0.3 hour to 36 hours. In some embodiments, the second time period is in the range of 0.5 hour to 30 hours. In some embodiments, the second time period is in the range of 0.5 hour to 72 hours. In some embodiments, the second time period is in the range of 1 hour to 24 hours.

In some embodiments, the third time period is in the range of 1 second to 120 minutes. In some embodiments, the third time period is in the range of 5 seconds to 60 minutes. In some embodiments, the third time period is in the range of 15 seconds to 30 minutes. In some embodiments, the third time period is in the range of 30 seconds to 20 minutes. In some embodiments, the third time period is in the range of 30 seconds to 120 minutes.

Embodiments of the present invention encompass methods including, but not limited to including, forming a blend comprising clay and liquid, where forming the blend comprising clay and liquid comprises mixing the clay, the liquid, and optionally, one or more first additives, for a fourth time period, prior to the addition of steel dust and/or a composition including, but not limited to including, steel dust. In some embodiments, the fourth time period is in the range of 5 seconds to 120 minutes. In some embodiments, the fourth time period is in the range of 10 seconds to 60 minutes. In some embodiments, the fourth time period is in the range of 15 seconds to 30 minutes. In some embodiments, the fourth time period is in the range of 30 seconds to 15 minutes. In some embodiments, the fourth time period is in the range of 30 seconds to 5 minutes. In some embodiments, the fourth time period is in the range of 45 seconds to 4 minutes.

Embodiments of the present invention encompass fluids including, but not limited to including, a combination of solids and liquid, where the solids include, but not limited to including, clay and industrial dust, such as, but not limited to, steel dust, and methods of making and using such fluids, and where the fluid may include one or more other materials (additives) in addition to clay and industrial dust. The additives may be added at any point and/or at any combination of points in the manufacture of the fluid. Non-limiting examples include addition to at least some of the liquid prior to the addition of either the clay or the steel dust, addition with the clay, addition with the steel dust, addition after both the clay and the steel dust are added, or addition after the clay is added and before the steel dust is added, or any combination of these. Different additives may be added at different points (or different combination of points) in the manufacturing process. In some embodiments, the additives are blended with a liquid which is then added at any point in the process (such as but not limited to those described herein) and the liquid with which the additive is blended may be the same or different from the liquid of the fluid to which the additive is added. As above, "different" means at least one different liquid and/or different proportions of two liquids. If the fluid includes more than one additive, they may be added in any order and/or concurrently. In some embodiments, the one or more additives may be blended with a liquid and then diluted with additional liquid, which may be the same as or different from the liquid of the initial blend, and then clay and/or steel dust may be added to the diluted additive blend and/or the diluted additive blend may be added to a blend of clay and/or steel dust and a liquid, where the liquid of the blend of clay and/or steel dust and a liquid may be the same as or different from the liquid of the initial additive blend, and/or the same as or different from the liquid used in diluting the initial additive blend, and/or the same as or different from the liquid of the diluted additive blend. There may be multiple additions of one additive in any of the above manners and/or any combination of the above manners, and/or multiple additives added via multiple additions as described herein.

The fluids described herein may be used in any number of well bore applications. In some embodiments, the fluids described herein may be used as a drilling fluid (also called drilling mud) used in drilling of oil and gas wells. The fluids described herein may be used in "non-conventional drilling practices," including, but not limited to including, under-balanced drilling (UBD) where the hydrostatic head of the drilling fluid used is lower than the pressure of the formation being drilled, and formation fluid are allowed to flow into the wellbore up to the surface. The fluids described herein may be used in other wellbore applications where the control of water filtration to formation is not required. The fluids described herein may be used as a killing fluid. A killing fluid is used to prevent flow from the well, also referred to as "blow out." Fluids used as killing fluids are typically higher density fluids.

The fluids described herein may be used with lost circulation materials (LCM) that are used to regain control of a well. Loss circulation occurs when highly permeable and/or fractured zones are encountered and the fluid is lost in the formation.

The following present non-limiting embodiments of the invention:

Embodiment 1

Embodiments of the present invention encompass methods of making a fluid for use in well-bore applications including, but not limited to including, the following:
forming a blend including, but not limited to including, a clay and a liquid;
after forming the blend including, but not limited to including, the clay and the liquid, adding steel dust and/or a composition including, but not limited to including, steel dust, to the blend including the clay and the liquid;
after adding the steel dust, which may be added by adding a composition including steel dust, mixing the blend for a first time period to form the fluid;
after the first time period, optionally aging the fluid including, but not limited to including, the clay, the steel dust, and the liquid for a second time period;
after the second time period, optionally mixing the fluid including, but not limited to including, the clay, the steel dust, and liquid for a third time period;
wherein the fluid formed includes, but is not limited to including, a combination of liquid and solids, the solids including, but not limited to including, the clay and the steel dust; and the liquid of the fluid including, but not limited to including, the liquid of the blend of the clay and liquid.

Embodiment 2

In some embodiments, such as but not limited to embodiment 1, the first time period is in the range of 5 seconds to 360 minutes.

Embodiment 3

In some embodiments, such as but not limited to, embodiment 1, the first time period is in the range of 5 seconds to 360 minutes.

Embodiment 4

In some embodiments, such as but not limited to, embodiment 1, the first time period is in the range of 10 seconds to 120 minutes.

Embodiment 5

In some embodiments, such as but not limited to, embodiment 1, the first time period is in the range of 15 seconds to 100 minutes.

Embodiment 6

In some embodiments, such as but not limited to, embodiment 1, the first time period is in the range of 30 seconds to 60 minutes.

Embodiment 7

In some embodiments, such as but not limited to, embodiment 1, the first time period is in the range of 30 seconds to 360 minutes.

Embodiment 8

In some embodiments, such as but not limited to, embodiment 1, the first time period is in the range of 30 seconds to 45 minutes.

Embodiment 9

In some embodiments, such as but not limited to, embodiment 1, the first time period is in the range of 5 minutes seconds to 35 minutes.

Embodiment 10

In some embodiments, such as but not limited to, embodiments 1-9, aging is allowing the blend to sit quiescently at a temperature in the range of 19° C. to 25° C. and a pressure of 1013.25 mbar (±150 mbar).

Embodiment 11

In some embodiments, such as but not limited to, embodiments 1-10, the second time period is in the range of 0.1 hour to 72 hours.

Embodiment 12

In some embodiments, such as but not limited to, embodiments 1-10, the second time period is in the range of 0.2 hour to 48 hours.

Embodiment 13

In some embodiments, such as but not limited to, embodiments 1-10, the second time period is in the range of 0.3 hour to 36 hours.

Embodiment 14

In some embodiments, such as but not limited to, embodiments 1-10, the second time period is in the range of 0.5 hour to 30 hours.

Embodiment 15

In some embodiments, such as but not limited to, embodiments 1-10, the second time period is in the range of 0.5 hour to 72 hours.

Embodiment 16

In some embodiments, such as but not limited to, embodiments 1-10, the second time period is in the range of 1 hour to 24 hours.

Embodiment 17

In some embodiments, such as but not limited to, embodiments 1-16, the third time period is in the range of 1 second to 120 minutes.

Embodiment 18

In some embodiments, such as but not limited to, embodiment 17, the third time period is in the range of 5 seconds to 60 minutes.

Embodiment 19

In some embodiments, such as but not limited to, embodiment 17, the third time period is in the range of 15 seconds to 30 minutes.

Embodiment 20

In some embodiments, such as but not limited to, embodiment 17, the third time period is in the range of 30 seconds to 20 minutes.

Embodiment 21

In some embodiments, such as but not limited to, embodiment 17, the third time period is in the range of 30 seconds to 120 minutes.

Embodiment 22

In some embodiments, such as but not limited to, embodiments 1-21, forming the blend includes, but is not limited to including, mixing the clay, the liquid, and optionally, one or more first additives, for a fourth time period.

Embodiment 23

In some embodiments, such as but not limited to, embodiment 22, the fourth time period is in the range of 5 seconds to 120 minutes.

Embodiment 24

In some embodiments, such as but not limited to, embodiment 22, the fourth time period is in the range of 10 seconds to 60 minutes.

Embodiment 25

In some embodiments, such as but not limited to, embodiment 22, the fourth time period is in the range of 15 seconds to 30 minutes.

Embodiment 26

In some embodiments, such as but not limited to, embodiment 22, the fourth time period is in the range of 30 seconds to 15 minutes.

Embodiment 27

In some embodiments, such as but not limited to, embodiment 22, the fourth time period is in the range of 30 seconds to 5 minutes.

Embodiment 28

In some embodiments, such as but not limited to, embodiment 22, the fourth time period is in the range of 45 seconds to 4 minutes.

Embodiment 29

In some embodiments, such as but not limited to, embodiments 1-28, one or more first additives are present in the formed blend including, but not limited to including, the clay and the liquid.

Embodiment 30

In some embodiments, such as but not limited to, embodiment 29, the one or more first additives are added before addition of the clay, after addition of the clay, concurrent with the addition of the clay, or a combination thereof, where different additives may be added at different points in the process and/or different portions of one or more of the one or more additives may be added at different points in the process.

Embodiment 31

In some embodiments, such as but not limited to, embodiments 29 and 30, at least some of one or more first additives are mixed with the at least some of the liquid prior to the addition of the clay.

Embodiment 32

In some embodiments, such as but not limited to, embodiment 29 and 30, at least some of the one or more first additives are added before, concurrently, and/or after addition of the clay and mixed only concurrently with the mixing of the clay with at least some of the liquid.

Embodiment 33

In some embodiments, such as but not limited to, embodiment 29 and 30, at least some of the one or more first additives are added after the clay has been added to and mixed with the at least some of the liquid.

Embodiment 34

In some embodiments, such as but not limited to, embodiment 30, at least some of the one or more first additives is added as a mixture with at least some of the liquid.

Embodiment 35

In some embodiments, such as but not limited to, embodiment 29 and 30, at least some of the one or more first additives are added to and mixed with at least some of the liquid before addition of the clay and subsequent mixing of the clay and at least some of the liquid.

Embodiment 36

In some embodiments, such as but not limited to, embodiment 29, at least some of the one or more first additives are added and mixed with at least some of the liquid before addition of clay mixed with at least some of the liquid.

Embodiment 37

In some embodiments, such as but not limited to, embodiment 1-36, the liquid of the blend of the clay and the liquid is a combination of two or more liquids.

Embodiment 38

In some embodiments, such as but not limited to, embodiments 1-37, steel dust is added.

Embodiment 39

In some embodiments, such as but not limited to, embodiment 1-37, a composition including, but not limited to including, steel dust is added, the composition also including, but not limited to including, one or more second additives.

Embodiment 40

In some embodiments, such as but not limited to, embodiment 39, at least one of the one more second additives is a liquid additive.

Embodiment 41

In some embodiments, such as but not limited to, embodiment 1-37, one or more third additives are added and blended after the first time period and before the aging.

Embodiment 42

In some embodiments, such as but not limited to, embodiment 41, the blending time for the one or more third additives is in the range of 5 seconds to 120 minutes.

Embodiment 43

In some embodiments, such as but not limited to, embodiment 41, the blending time for the one or more third additives is in the range of 10 seconds to 60 minutes.

Embodiment 44

In some embodiments, such as but not limited to, embodiment 41, the blending time for the one or more third additives is in the range of 15 seconds to 30 minutes.

Embodiment 45

In some embodiments, such as but not limited to, embodiment 41, the blending time for the one or more third additives is in the range of 30 seconds to 15 minutes.

Embodiment 46

In some embodiments, such as but not limited to, embodiment 41, the blending time for the one or more third additives is in the range of 30 seconds to 5 minutes.

Embodiment 47

In some embodiments, such as but not limited to, embodiment 41, the blending time for the one or more third additives is in the range of 45 seconds to 4 minutes.

Embodiment 48

In some embodiments, such as but not limited to, embodiment 1-47, the steel dust includes, but is not limited to including: calcium oxide; and iron, one or more oxides of iron, or both iron and one or more oxides of iron; and at least 10 wt % of the steel dust is calcium oxide.

Embodiment 49

A fluid including, but not limited to including, a combination of solids and liquid, the solids including, but not limited to including: clay; one or more optional fourth additives; and steel dust, the steel dust including, but not limited to including: calcium oxide; and iron, one or more oxides of iron, or both iron and one or more oxides of iron; and at least 10 wt % of the steel dust is calcium oxide.

Embodiment 50

In some embodiments, such as but not limited to, embodiments 1-49, the % solids in the fluid is in the range of 0.25 wt % to 80 wt %.

Embodiment 51

In some embodiments, such as but not limited to, embodiments 1-49, the % solids in the fluid is in the range of 0.25 wt % to 65 wt %.

Embodiment 52

In some embodiments, such as but not limited to, embodiments 1-49, the % solids in the fluid is in the range of 0.25 wt % to 60 wt %.

Embodiment 53

In some embodiments, such as but not limited to, embodiments 1-49, the % solids in the fluid is in the range of 0.25 wt % to 55 wt %.

Embodiment 54

In some embodiments, such as but not limited to, embodiments 1-49, the % solids in the fluid is in the range of 0.25 wt % to 50 wt %.

Embodiment 55

In some embodiments, such as but not limited to, embodiments 1-49, the % solids in the fluid is in the range of 0.25 wt % to 45 wt %.

Embodiment 56

In some embodiments, such as but not limited to, embodiments 1-49, the % solids in the fluid is in the range of 0.25 wt % to 35 wt %.

Embodiment 57

In some embodiments, such as but not limited to, embodiments 1-49, the % solids in the fluid is in the range of 0.25 wt % to 30 wt %.

Embodiment 58

In some embodiments, such as but not limited to, embodiments 1-49, the % solids in the fluid is in the range of 0.25 wt % to 25 wt %.

Embodiment 59

In some embodiments, such as but not limited to, embodiments 1-49, the % solids in the fluid is in the range of 0.25 wt % to 20 wt %.

Embodiment 60

In some embodiments, such as but not limited to, embodiments 1-49, the % solids in the fluid is in the range of 0.1 wt % to 20 wt %.

Embodiment 61

In some embodiments, such as but not limited to, embodiments 1-49, the % solids in the fluid is in the range of 0.1 wt % to 18 wt %.

Embodiment 62

In some embodiments, such as but not limited to, embodiments 1-49, the % solids in the fluid is in the range of 0.2 wt % to 16 wt %.

Embodiment 63

In some embodiments, such as but not limited to, embodiments 1-49, the % solids in the fluid is in the range of 0.2 wt % to 15 wt %.

Embodiment 64

In some embodiments, such as but not limited to, embodiments 1-49, the % solids in the fluid is in the range of 0.2 wt % to 12 wt %.

Embodiment 65

In some embodiments, such as but not limited to, embodiments 1-49, the % solids in the fluid is in the range of 0.2 wt % to 10 wt %.

Embodiment 66

In some embodiments, such as but not limited to, embodiments 1-49, the % solids in the fluid is in the range of 0.5 wt % to 8 wt %.

Embodiment 67

In some embodiments, such as but not limited to, embodiments 1-66, the sum of the wt % clay and the wt % steel dust is at least 50 wt % of the solids.

Embodiment 68

In some embodiments, such as but not limited to, embodiment 67, the sum of the wt % clay and the wt % steel dust is at least 55 wt % of the solids.

Embodiment 69

In some embodiments, such as but not limited to, embodiment 67, the sum of the wt % clay and the wt % steel dust is at least 60 wt % of the solids.

Embodiment 70

In some embodiments, such as but not limited to, embodiment 67, the sum of the wt % clay and the wt % steel dust is at least 65 wt % of the solids.

Embodiment 71

In some embodiments, such as but not limited to, embodiment 67, the sum of the wt % clay and the wt % steel dust is at least 70 wt % of the solids.

Embodiment 72

In some embodiments, such as but not limited to, embodiment 67, the sum of the wt % clay and the wt % steel dust is at least 75 wt % of the solids.

Embodiment 73

In some embodiments, such as but not limited to, embodiment 67, the sum of the wt % clay and the wt % steel dust is at least 80 wt % of the solids.

Embodiment 74

In some embodiments, such as but not limited to, embodiment 67, the sum of the wt % clay and the wt % steel dust is at least 85 wt % of the solids.

Embodiment 75

In some embodiments, such as but not limited to, embodiment 67, the sum of the wt % clay and the wt % steel dust is at least 90 wt % of the solids.

Embodiment 76

In some embodiments, such as but not limited to, embodiment 67, the sum of the wt % clay and the wt % steel dust is at least 95 wt % of the solids.

Embodiment 77

In some embodiments, such as but not limited to, embodiment 67, the sum of the wt % clay and the wt % steel dust is at least 96 wt % of the solids.

Embodiment 78

In some embodiments, such as but not limited to, embodiment 67, the sum of the wt % clay and the wt % steel dust is at least 97 wt % of the solids.

Embodiment 79

In some embodiments, such as but not limited to, embodiment 67, the sum of the wt % clay and the wt % steel dust is at least 97.5 wt % of the solids.

Embodiment 80

In some embodiments, such as but not limited to, embodiment 67, the sum of the wt % clay and the wt % steel dust is at least 98 wt % of the solids.

Embodiment 81

In some embodiments, such as but not limited to, embodiment 67, the sum of the wt % clay and the wt % steel dust is at least 98.5 wt % of the solids.

Embodiment 82

In some embodiments, such as but not limited to, embodiment 67, the sum of the wt % clay and the wt % steel dust is at least 99 wt % of the solids.

Embodiment 83

In some embodiments, such as but not limited to, embodiment 67, the sum of the wt % clay and the wt % steel dust is at least 99.5 wt % of the solids.

Embodiment 84

In some embodiments, such as but not limited to, embodiment 67, the sum of the wt % clay and the wt % steel dust is at least 99.8 wt % of the solids.

Embodiment 85

In some embodiments, such as but not limited to, embodiments 67-84, the sum of the wt % clay and the wt % steel dust is not more than 100 wt % of the solids.

Embodiment 86

In some embodiments, such as but not limited to, embodiments 1-85, the weight to weight ratio of steel dust to clay is in the range of 1:1000 to 10:1.

Embodiment 87

In some embodiments, such as but not limited to, embodiment 86, the weight to weight ratio of steel dust to clay is in the range of 1:500 to 9:1.

Embodiment 88

In some embodiments, such as but not limited to, embodiment 86, the weight to weight ratio of steel dust to clay is in the range of 1:450 to 8:1.

Embodiment 89

In some embodiments, such as but not limited to, embodiment 86, the weight to weight ratio of steel dust to clay is in the range of 1:400 to 8:1.

Embodiment 90

In some embodiments, such as but not limited to, embodiment 86, the weight to weight ratio of steel dust to clay is in the range of 1:300 to 5:1.

Embodiment 91

In some embodiments, such as but not limited to, embodiment 86, the weight to weight ratio of steel dust to clay is in the range of 1:200 to 2:1.

Embodiment 92

In some embodiments, such as but not limited to, embodiment 86, the weight to weight ratio of steel dust to clay is in the range of 1:1000 to 1:1.

Embodiment 93

In some embodiments, such as but not limited to, embodiment 86, the weight to weight ratio of steel dust to clay is in the range of 1:200 to 1:3.

Embodiment 94

In some embodiments, such as but not limited to, embodiment 86, the weight to weight ratio of steel dust to clay is in the range of 1:200 to 1:2.

Embodiment 95

In some embodiments, such as but not limited to, embodiment 86, the weight to weight ratio of steel dust to clay is in the range of 1:200 to 9:20.

Embodiment 96

In some embodiments, such as but not limited to, embodiment 86, the weight to weight ratio of steel dust to clay is in the range of 1:200 to 6:13.

Embodiment 97

In some embodiments, such as but not limited to, embodiment 86, the weight to weight ratio of steel dust to clay is in the range of 1:200 to 16:35.

Embodiment 98

In some embodiments, such as but not limited to, embodiment 86, the weight to weight ratio of steel dust to clay is in the range of 1:200 to 7:20.

Embodiment 99

In some embodiments, such as but not limited to, embodiment 86, the weight to weight ratio of steel dust to clay is in the range of 1:1000 to 1:100 to 1:4.

Embodiment 100

In some embodiments, such as but not limited to, embodiment 86, the weight to weight ratio of steel dust to clay is in the range of 1:200 to 3:8.

Embodiment 101

In some embodiments, such as but not limited to, embodiment 86, the weight to weight ratio of steel dust to clay is in the range of 1:200 to 3:11.

Embodiment 102

In some embodiments, such as but not limited to, embodiment 86, the weight to weight ratio of steel dust to clay is in the range of 1:12 to 1:4.

Embodiment 103

In some embodiments, such as, but not limited to, embodiments 1-102, the zeta potential of the steel dust at 150 mg/liter in distilled water is less than −15 mV (more negative) at a pH in the range of 8 to 11.

Embodiment 104

In some embodiments, such as, but not limited to, embodiments 1-102, the zeta potential of the steel dust at 150 mg/liter in distilled water is less than −20 mV (more negative) at a pH in the range of 9 to 11.

Embodiment 105

In some embodiments, such as, but not limited to, embodiments 1-102, the zeta potential of the steel dust at 150 mg/liter in distilled water is less than −30 mV (more negative) at a pH in the range of 10 to 11.

Embodiment 106

In some embodiments, such as, but not limited to, embodiments 1-105, the turbidity of the steel dust at 150 mg/liter in distilled water is at least 140 NTU when the pH is in the range of 4 to 11.

Embodiment 107

In some embodiments, such as, but not limited to, embodiments 1-105, the turbidity of the steel dust at 150 mg/liter in distilled water is at least 150 NTU when the pH is in the range of 7 to 11.

Embodiment 108

In some embodiments, such as, but not limited to, embodiments 1-105, the turbidity of the steel dust at 150 mg/liter in distilled water is at least 160 NTU when the pH is in the range of 8 to 11.

Embodiment 109

In some embodiments, such as, but not limited to, embodiments 1-108, the volume average particle diameter of the steel dust added is in the range of 10-30 μm.

Embodiment 110

In some embodiments, such as, but not limited to, embodiments 1-108, the volume average particle diameter of the steel dust added is in the range of 12-27 μm.

Embodiment 111

In some embodiments, such as, but not limited to, embodiments 1-108, the volume average particle diameter of the steel dust added is in the range of 15-25 μm.

Embodiment 112

In some embodiments, such as, but not limited to, embodiments 1-108, the volume average particle diameter of the steel dust added is in the range of 17-23 μm.

Embodiment 113

In some embodiments, such as, but not limited to, embodiments 1-112, the volume average particle diameter of the clay added is in the range of 1-20 μm.

Embodiment 114

In some embodiments, such as, but not limited to, embodiments 1-112, the volume average particle diameter of the clay added is in the range of 2-16 μm.

Embodiment 115

In some embodiments, such as, but not limited to, embodiments 1-112, the volume average particle diameter of the clay added is in the range of 4-13 μm.

Embodiment 116

In some embodiments, such as, but not limited to, embodiments 1-112, the volume average particle diameter of the clay added is in the range of 5-12 μm.

Embodiment 117

In some embodiments, such as but not limited to, embodiments 1-116, the clay is a combination of two or more clays.

Embodiment 118

In some embodiments, such as, but not limited to, embodiments 48-117, at least 15 wt % of the steel dust is calcium oxide.

Embodiment 119

In some embodiments, such as, but not limited to, embodiment 118, at least 20 wt % of the steel dust is calcium oxide.

Embodiment 120

In some embodiments, such as, but not limited to, embodiment 118, at least 25 wt % of the steel dust is calcium oxide.

Embodiment 121

In some embodiments, such as, but not limited to, embodiment 118, at least 30 wt % of the steel dust is calcium oxide.

Embodiment 122

In some embodiments, such as, but not limited to, embodiment 118, at least 35 wt % of the steel dust is calcium oxide.

Embodiment 123

In some embodiments, such as, but not limited to, embodiments 48-122, the sum of the wt % calcium oxide, the wt % iron, and the wt % oxides of iron is at least 50 wt % of the steel dust.

Embodiment 124

In some embodiments, such as, but not limited to, embodiment 103, the sum of the wt % calcium oxide, the wt % iron, and the wt % oxides of iron is at least 55 wt % of the steel dust.

Embodiment 125

In some embodiments, such as, but not limited to, embodiment 123, the sum of the wt % calcium oxide, the wt % iron, and the wt % oxides of iron is at least 60 wt % of the steel dust.

Embodiment 126

In some embodiments, such as, but not limited to, embodiment 123, the sum of the wt % calcium oxide, the wt % iron, and the wt % oxides of iron is at least 65 wt % of the steel dust.

Embodiment 127

In some embodiments, such as, but not limited to, embodiment 123, the sum of the wt % calcium oxide, the wt % iron, and the wt % oxides of iron is at least 70 wt % of the steel dust.

Embodiment 128

In some embodiments, such as, but not limited to, embodiment 123, the sum of the wt % calcium oxide, the wt % iron, and the wt % oxides of iron is at least 75 wt % of the steel dust.

Embodiment 129

In some embodiments, such as, but not limited to, embodiment 123, the sum of the wt % calcium oxide, the wt % iron, and the wt % oxides of iron is at least 80 wt % of the steel dust.

Embodiment 130

In some embodiments, such as, but not limited to, embodiment 123, the sum of the wt % calcium oxide, the wt % iron, and the wt % oxides of iron is at least 85 wt % of the steel dust.

Embodiment 131

In some embodiments, such as, but not limited to, embodiment 123, the sum of the wt % calcium oxide, the wt % iron, and the wt % oxides of iron is at least 90 wt % of the steel dust.

Embodiment 132

In some embodiments, such as, but not limited to, embodiment 123, the sum of the wt % calcium oxide, the wt % iron, and the wt % oxides of iron is at least 75 wt % of the steel dust.

Embodiment 133

In some embodiments, such as, but not limited to, embodiment 123, the sum of the wt % calcium oxide, the wt % iron, and the wt % oxides of iron is at least 95 wt % of the steel dust.

Embodiment 134

In some embodiments, such as, but not limited to, embodiment 123, the sum of the wt % calcium oxide, the wt % iron, and the wt % oxides of iron is at least 97 wt % of the steel dust.

Embodiment 135

In some embodiments, such as, but not limited to, embodiment 123, the sum of the wt % calcium oxide, the wt % iron, and the wt % oxides of iron is at least 98 wt % of the steel dust.

Embodiment 136

In some embodiments, such as, but not limited to, embodiment 123, the sum of the wt % calcium oxide, the wt % iron, and the wt % oxides of iron is at least 99 wt % of the steel dust.

Embodiment 137

In some embodiments, such as, but not limited to, embodiments 48-136, for the steel dust, the weight to weight ratio of the calcium oxide to the iron, one or more oxides of iron, or both iron and one or more oxides of iron is in the range of 1:9 to 9:1.

Embodiment 138

In some embodiments, such as, but not limited to, embodiment 137, for the steel dust, the weight to weight ratio of the calcium oxide to the iron, one or more oxides of iron, or both iron and one or more oxides of iron is in the range of 2:8 to 8:2.

Embodiment 139

In some embodiments, such as, but not limited to, embodiment 137, for the steel dust, the weight to weight ratio of the calcium oxide to the iron, one or more oxides of iron, or both iron and one or more oxides of iron is in the range of 3:7 to 7:3.

Embodiment 140

In some embodiments, such as, but not limited to, embodiment 137, for the steel dust, the weight to weight ratio of the calcium oxide to the iron, one or more oxides of iron, or both iron and one or more oxides of iron is in the range of 1:3 to 3:1.

Embodiment 141

In some embodiments, such as, but not limited to, embodiment 137, for the steel dust, the weight to weight ratio of the calcium oxide to the iron, one or more oxides of iron, or both iron and one or more oxides of iron is in the range of 2:3 to 3:2.

Embodiment 142

In some embodiments, such as, but not limited to, embodiment 137, for the steel dust, the weight to weight ratio of the calcium oxide to the iron, one or more oxides of iron, or both iron and one or more oxides of iron is in the range of 3:4 to 4:3.

Embodiment 143

In some embodiments, such as, but not limited to, embodiment 137, for the steel dust, the weight to weight ratio of the calcium oxide to the iron, one or more oxides of iron, or both iron and one or more oxides of iron is in the range of 4:5 to 5:4.

Embodiment 144

In some embodiments, such as, but not limited to, embodiment 137, for the steel dust, the weight to weight ratio of the calcium oxide to the iron, one or more oxides of iron, or both iron and one or more oxides of iron is in the range of 9:11 to 11:9.

Embodiment 145

In some embodiments, such as, but not limited to, embodiments 1-122, at least 20 wt % of the steel dust is iron, one or more oxides of iron, or both iron and one or more oxides of iron.

Embodiment 146

In some embodiments, such as, but not limited to, embodiment 145, at least 25 wt % of the steel dust is iron, one or more oxides of iron, or both iron and one or more oxides of iron.

Embodiment 147

In some embodiments, such as, but not limited to, embodiment 145, at least 30 wt % of the steel dust is iron, one or more oxides of iron, or both iron and one or more oxides of iron.

Embodiment 148

In some embodiments, such as, but not limited to, embodiment 145, at least 35 wt % of the steel dust is iron, one or more oxides of iron, or both iron and one or more oxides of iron.

Embodiment 149

In some embodiments, such as, but not limited to, embodiment 145, at least 40 wt % of the steel dust is iron, one or more oxides of iron, or both iron and one or more oxides of iron.

Embodiment 150

In some embodiments, such as, but not limited to, embodiment 145, at least 45 wt % of the steel dust is iron, one or more oxides of iron, or both iron and one or more oxides of iron.

Embodiment 151

In some embodiments, such as, but not limited to, embodiment 145, at least 50 wt % of the steel dust is iron, one or more oxides of iron, or both iron and one or more oxides of iron.

Embodiment 152

In some embodiments, such as, but not limited to, embodiment 145, at least 55 wt % of the steel dust is calcium oxide, iron, and one or more oxides of iron.

Embodiment 153

In some embodiments, such as, but not limited to, embodiment 145, at least 60 wt % of the steel dust is calcium oxide, iron, and one or more oxides of iron.

Embodiment 154

In some embodiments, such as, but not limited to, embodiment 145, at least 65 wt % of the steel dust is calcium oxide and iron, one or more oxides of iron, or both iron and one or more oxides of iron.

Embodiment 155

In some embodiments, such as, but not limited to, embodiment 145, at least 70 wt % of the steel dust is calcium oxide, iron, and one or more oxides of iron.

Embodiment 156

In some embodiments, such as, but not limited to, embodiment 145, at least 75 wt % of the steel dust is calcium oxide and iron, one or more oxides of iron, or both iron and one or more oxides of iron.

Embodiment 157

In some embodiments, such as, but not limited to, embodiment 145, at least 80 wt % of the steel dust is calcium oxide, iron, and one or more oxides of iron.

Embodiment 158

In some embodiments, such as but not limited to, embodiment 1-157, the steel dust includes, but is not limited to including, steel dust sourced from baghouse dust.

Embodiment 159

In some embodiments, such as but not limit to, embodiments 1-158, the steel dust is a combination of steel dust from different sources.

Embodiment 160

In some embodiments, such as but not limit to, embodiments 1-159, the steel dust is replaced in whole or in part with another industrial dust or combination of industrial dusts.

Embodiment 161

In some embodiments, such as but not limited to, embodiments 1-160, the liquid of the fluid is a combination of two or more liquids.

Embodiment 162

In some embodiments, such as but not limited to, embodiment 1-161, the liquid of the fluid includes, but is not limited to including, water.

Embodiment 163

In some embodiments, such as but not limited to, embodiment 1-162, the liquid of the fluid includes water and at least one other liquid.

Embodiment 164

In some embodiments, such as but not limited to, embodiment 1-163, the clay includes, but is not limited to including, bentonite clay.

Embodiment 165

In some embodiments, such as but not limited to, embodiments 22-164, at least one of the one or more additives, including, but not limited to including, the one or more first additives, the one or more second additives, the one or more third additives, the one or more fourth additives, or any combination thereof, independently include, but are not limited to including, one or more salts, one or more surfactants, one or more dispersants, one or more deflocculants, one or more viscosity modifiers, one or more rheology control agents, one or more fluid loss additives, one or more shale stabilizers, one or more weighting materials, or any combination thereof.

Embodiment 166

In some embodiments, such as but not limited to, embodiment 165, at least one of the one or more additives, including, but not limited to including, the one or more first additives, the one or more second additives, the one or more third additives, the one or more fourth additives, or any combination thereof, independently include, but are not limited to including, one or more salts.

Embodiment 167

In some embodiments, such as but not limited to, embodiment 165, at least one of the one or more additives, including, but not limited to including, the one or more first additives, the one or more second additives, the one or more third additives, the one or more fourth additives, or any combination thereof, independently include, but are not limited to including, one or more surfactants.

Embodiment 168

In some embodiments, such as but not limited to, embodiment 165, at least one of the one or more additives, including, but not limited to including, the one or more first additives, the one or more second additives, the one or more third additives, the one or more fourth additives, or any combination thereof, independently include, but are not limited to including, one or more dispersants.

Embodiment 169

In some embodiments, such as but not limited to, embodiment 165, at least one of the one or more additives, including, but not limited to including, the one or more first additives, the one or more second additives, the one or more third additives, the one or more fourth additives, or any combination thereof, independently include, but are not limited to including, one or more deflocculants.

Embodiment 170

In some embodiments, such as but not limited to, embodiment 165, at least one of the one or more additives, including, but not limited to including, the one or more first additives, the one or more second additives, the one or more third additives, the one or more fourth additives, or any combination thereof, independently include, but are not limited to including, one or more viscosity modifiers.

Embodiment 171

In some embodiments, such as but not limited to, embodiment 165, at least one of the one or more additives, including, but not limited to including, the one or more first additives, the one or more second additives, the one or more third additives, the one or more fourth additives, or any combination thereof, independently include, but are not limited to including, one or more rheology control agents.

Embodiment 172

In some embodiments, such as but not limited to, embodiment 165, at least one of the one or more additives, including, but not limited to including, the one or more first additives, the one or more second additives, the one or more third additives, the one or more fourth additives, or any combination thereof, independently include, but are not limited to including, one or more fluid loss additives.

Embodiment 173

In some embodiments, such as but not limited to, embodiment 165, at least one of the one or more additives, including, but not limited to including, the one or more first additives, the one or more second additives, the one or more third additives, the one or more fourth additives, or any combination thereof, independently include, but are not limited to including, one or more shale stabilizers.

Embodiment 174

In some embodiments, such as but not limited to, embodiment 165, at least one of the one or more additives, including, but not limited to including, the one or more first additives, the one or more second additives, the one or more third additives, the one or more fourth additives, or any combination thereof, independently include, but are not limited to including, one or more weighting materials.

Embodiment 175

In some embodiments, such as but not limited to, embodiments 22-164, at least one of the one or more additives, including, but not limited to including, the one or more first additives, the one or more second additives, the one or more third additives, the one or more fourth additives, or any combination thereof, independently include, but are not limited to including, one or more starches, carboxymethyl cellulose, xanthan gum, or a combination thereof.

Embodiment 176

In some embodiments, such as but not limited to, embodiments 22-164, at least one of the one or more additives, including, but not limited to including, the one or more first additives, the one or more second additives, the one or more third additives, the one or more fourth additives, or any combination thereof, independently include, but are not limited to including, one or more silcones.

Embodiment 177

In some embodiments, such as but not limited to, embodiments 22-164, at least one of the one or more additives, including, but not limited to including, the one or more first additives, the one or more second additives, the one or more third additives, the one or more fourth additives, or any combination thereof, independently include, but are not limited to including, barite.

Embodiment 178

In some embodiments, such as but not limited to, embodiments 22-164, at least one of the one or more additives, including, but not limited to including, the one or more first additives, the one or more second additives, the one or more third additives, the one or more fourth additives, or any combination thereof, independently include, but are not limited to including, $NaCl$, $NaBr$, $KCl$, $CaCl_2$, $NaNO_3$, $NaC_2H_3O_2$, $KC_2H_3O_2$, $NaCHO_2$, $CsCHO_2$, $KCHO_2$, or a combination thereof.

Embodiment 179

In some embodiments, such as but not limited to, embodiments 1-178, the fluid has an apparent viscosity of at least 30 cP.

Embodiment 180

In some embodiments, such as but not limited to, embodiments 1-178, the fluid has an apparent viscosity of at least 32 cP.

Embodiment 181

In some embodiments, such as but not limited to, embodiments 1-178, the fluid has an apparent viscosity of at least 36 cP.

Embodiment 182

In some embodiments, such as but not limited to, embodiments 1-178, the fluid has an apparent viscosity of at least 38 cP.

Embodiment 183

In some embodiments, such as but not limited to, embodiments 1-178, the fluid has an apparent viscosity of at least 40 cP.

Embodiment 184

In some embodiments, such as but not limited to, embodiments 1-178, the fluid has an apparent viscosity of at least 42 cP.

Embodiment 185

In some embodiments, such as but not limited to, embodiments 1-184, the fluid has a plastic viscosity of not more than 22 cP.

Embodiment 186

In some embodiments, such as but not limited to, embodiments 1-184, the fluid has a plastic viscosity of not more than 20 cP.

Embodiment 187

In some embodiments, such as but not limited to, embodiments 1-184, the fluid has a plastic viscosity of not more than 18 cP.

Embodiment 188

In some embodiments, such as but not limited to, embodiments 1-184, the fluid has a plastic viscosity of not more than 16 cP.

Embodiment 189

In some embodiments, such as but not limited to, embodiments 1-184, the fluid has a plastic viscosity of not more than 14 cP.

Embodiment 190

In some embodiments, such as but not limited to, embodiments 1-184, the fluid has a plastic viscosity of not more than 12 cP.

Embodiment 191

In some embodiments, such as but not limited to, embodiments 1-190, the fluid has a yield point of at least 25 lb/100 ft$^2$.

Embodiment 192

In some embodiments, such as but not limited to, embodiments 1-190, the fluid has a yield point of at least 30 lb/100 ft$^2$.

Embodiment 193

In some embodiments, such as but not limited to, embodiments 1-190, the fluid has a yield point of at least 32 lb/100 ft$^2$.

Embodiment 194

In some embodiments, such as but not limited to, embodiments 1-190, the fluid has a yield point of at least 35 lb/100 ft$^2$.

Embodiment 195

In some embodiments, such as but not limited to, embodiments 1-190, the fluid has a yield point of at least 40 lb/100 ft$^2$.

Embodiment 196

In some embodiments, such as but not limited to, embodiments 1-190, the fluid has a yield point of at least 45 lb/100 ft$^2$.

Embodiment 197

In some embodiments, such as but not limited to, embodiments 1-190, the fluid has a yield point of at least 50 lb/100 ft$^2$.

Embodiment 198

In some embodiments, such as but not limited to, embodiments 1-190, the fluid has a yield point of at least 55 lb/100 ft$^2$.

Embodiment 199

In some embodiments, such as but not limited to, embodiments 1-190, the fluid has a yield point of at least 60 lb/100 ft$^2$.

Embodiment 200

In some embodiments, such as but not limited to, embodiments 1-190, the fluid has a yield point of at least 62 lb/100 ft$^2$.

Embodiment 201

In some embodiments, such as but not limited to, embodiments 1-200, the fluid exhibits a filtration of at least 15 ml filtration in the API filtration test.

Embodiment 202

In some embodiments, such as but not limited to, embodiments 1-200, the fluid exhibits a filtration of at least 16 ml filtration in the API filtration test.

Embodiment 203

In some embodiments, such as but not limited to, embodiments 1-200, the fluid exhibits a filtration of at least 17 ml filtration in the API filtration test.

Embodiment 204

In some embodiments, such as but not limited to, embodiments 1-200, the fluid exhibits a filtration of at least 18 ml filtration in the API filtration test.

Embodiment 205

In some embodiments, such as but not limited to, embodiments 1-200, the fluid exhibits a filtration of at least 19 ml filtration in the API filtration test.

Embodiment 206

In some embodiments, such as but not limited to, embodiments 1-200, the fluid exhibits a filtration of at least 20 ml filtration in the API filtration test.

Embodiment 207

In some embodiments, such as but not limited to, embodiments 1-200, the fluid exhibits a filtration of at least 21 ml filtration in the API filtration test.

Embodiment 208

In some embodiments, such as but not limited to, embodiments 1-200, the fluid exhibits a filtration of at least 22 ml filtration in the API filtration test.

Embodiment 209

In some embodiments, such as but not limited to, embodiments 1-200, the fluid exhibits a filtration of at least 23 ml filtration in the API filtration test.

Embodiment 210

In some embodiments, such as but not limited to, embodiments 1-200, the fluid exhibits a filtration of at least 24 ml filtration in the API filtration test.

Embodiment 211

In some embodiments, such as but not limited to, embodiments 1-200, the fluid exhibits a filtration of at least 25 ml filtration in the API filtration test.

Embodiment 212

In some embodiments, such as but not limited to, embodiments 1-200, the fluid exhibits a filtration of at least 30 ml filtration in the API filtration test.

Embodiment 213

In some embodiments, such as but not limited to, embodiments 1-212, the fluid exhibits a mud cake thickness of not more than 3.5 mm in the API filtration test.

Embodiment 214

In some embodiments, such as but not limited to, embodiments 1-212, the fluid exhibits a mud cake thickness of not more than 3.25 mm in the API filtration test.

Embodiment 215

In some embodiments, such as but not limited to, embodiments 1-212, the fluid exhibits a mud cake thickness of not more than 3.1 mm in the API filtration test.

Embodiment 216

In some embodiments, such as but not limited to, embodiments 1-215, the fluid is used in a well-bore application.

Embodiment 217

In some embodiments, such as but not limited to, embodiments 1-215, the fluid is used as a drilling fluid.

Embodiment 218

In some embodiments, such as but not limited to, embodiments 1-215, the fluid is used as a killing fluid.

Embodiment 219

In some embodiments, such as but not limited to, embodiments 1-215, the fluid is used in underbalanced drilling.

Embodiment 220

A process of drilling a well in an earth formation including, but not limited to including, circulating in the well while drilling any one of the fluids of embodiments 1-219.

Embodiment 221

In some embodiments, such as but not limited to, embodiment 220, the drilling is underbalanced drilling.

Embodiment 222

In some embodiments, such as but not limited to, embodiment 220, the fluid is used as a killing fluid.

EXAMPLES

The following examples are given to aid in understanding the invention, but it is to be understood that the invention is not limited to the particular materials or procedures of the examples.

Example 1

Several samples of steel dust were obtained and characterized—Ladle Furnace (LF) slag, Baghouse dust (BHD), and Cyclone silo dust.

The first test utilized X-Ray diffraction (XRD) data to determine the chemical composition. The XRD data was determined using a benchtop powder X-ray diffraction (XRD) instrument, and the intensity of the XRD peaks is plotted against the values of 2-theta (2Θ) from 5 to 90 degrees, that is the angle between the transmitted X-ray beam and the diffracted X-ray. As a comparison, bentonite clay, typically used as a drilling fluid additive, was also analyzed. The results of the XRD assay are presented in FIG. 1 as a bar chart. The Ladle Furnace (LF) slag type had a high silica content and low iron content.

Turbidity and zeta potential were measured for the LF and BHD samples. The turbidity measurement utilized a Hach 2100N turbidity meter, the turbidity of 150 ppm suspension of each sample is measured in Nephelometric Turbidity Units (NTU). The measurements of zeta potential utilized a Zetasizer ZEN3600 (Malvern Instruments Ltd., UK), the 150 ppm suspension samples is filtered using 0.45 μm pore-sized filters and tested at room temperature.

Figure 2:
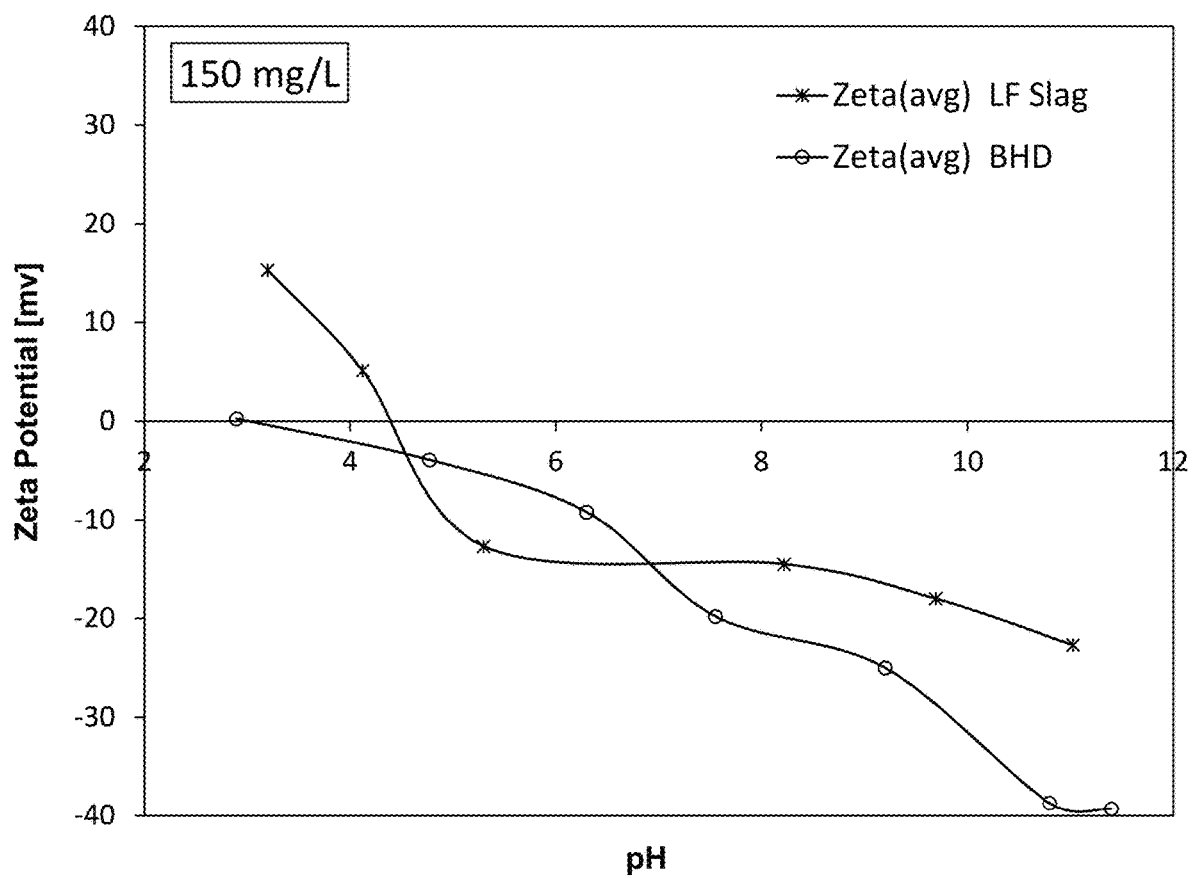
FIG. 2 is a graph of the zeta potential for two types of steel dust.

As seen in FIG. 2, that provides the results of the zeta potential, both the LF and BHD exhibit a negative zeta potential over most of the pH range tested. However, the LF exhibited lower zeta potential values (≈−15 mV) in the pH range of about 5 to 6. On the other hand, the bag house dust (BHD) showed high negative zeta potential (≈−35 mV) at high pH, and this high pH is the typical drilling fluid condition.

Figure 3:
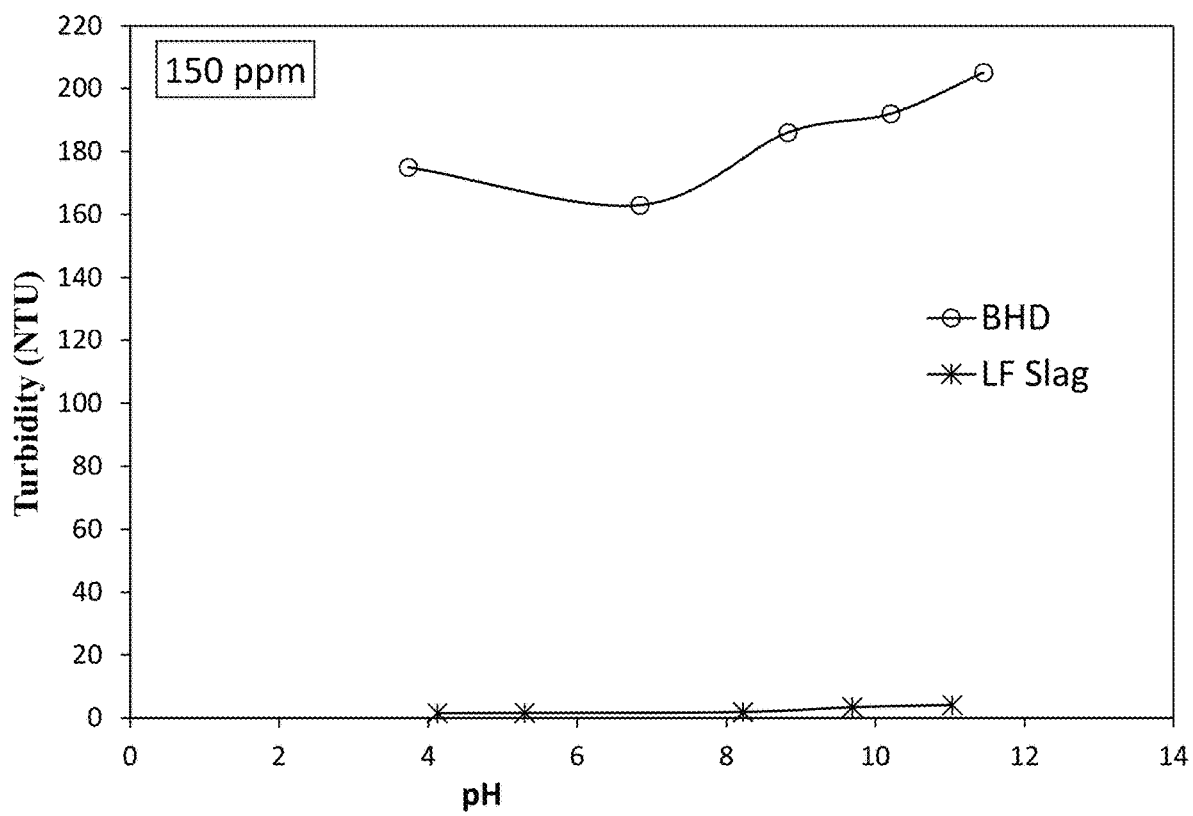
FIG. 3 is a graph of the turbidity for two types of steel dust.

As seen in FIG. 3, that provides the results of the turbidity, the BHD exhibited a high turbidity, but the LF had a low turbidity. The lower zeta potential of the LF likely influenced the dispersion properties, indicated by the very low turbidity over the entire pH range. The low turbidity of the LF is an indication of poor suspension stability. On the other hand, the BHD showed high turbidity, an indication of very good dispersion stability, across the pH range.

Example 2

Particle size is a very important parameter that affects dispersion stability and water filtration control. Therefore, further evaluation was performed on the bag house dust (BHD). Samples of the BHD were sieved through a 200-mesh sieve (75 μm) to remove course particles prior to assay. The volume average particle size distribution and D50 (median) particle size were determined from the data of particle size analysis conducted using a Mastersizer 3000 (Malvern Instruments Ltd., UK), by wet dispersion method.

Figure 4:
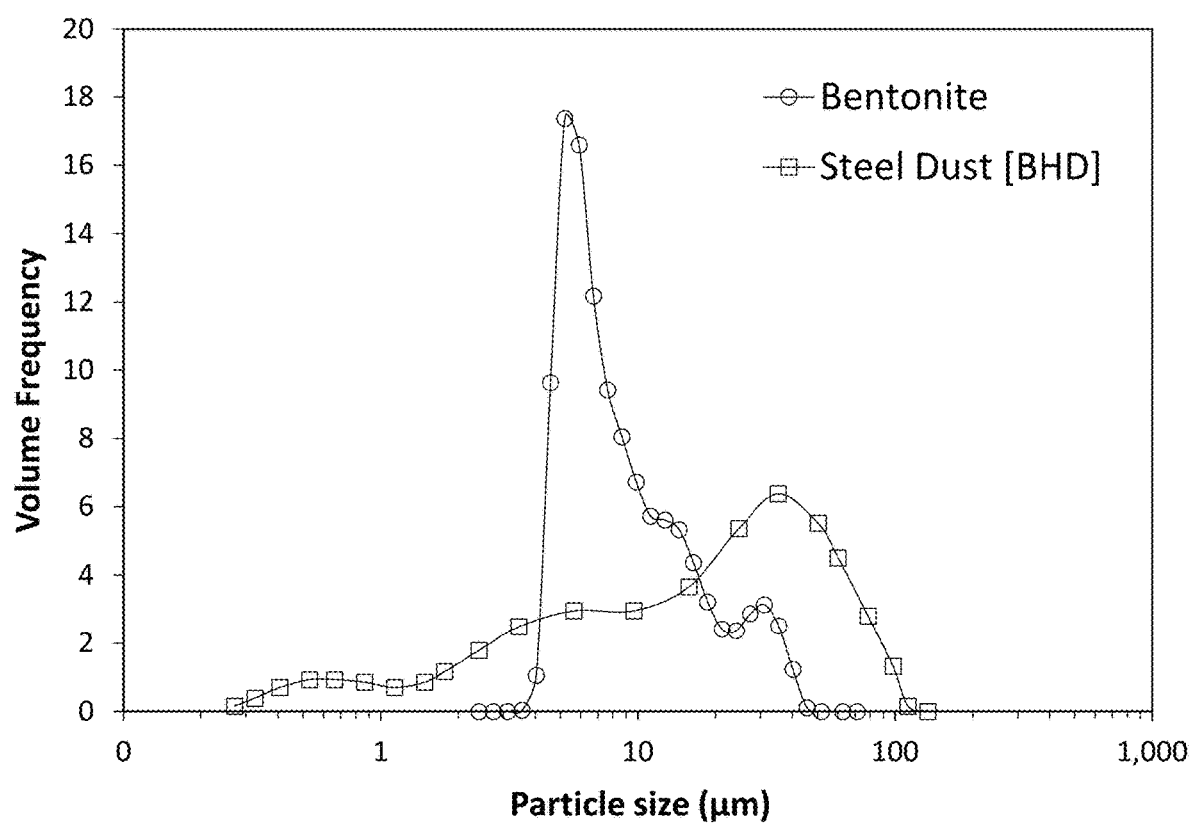
FIG. 4 is a graph of the volume frequency versus particle size for bentonite and one type of steel dust.
Figure 5:
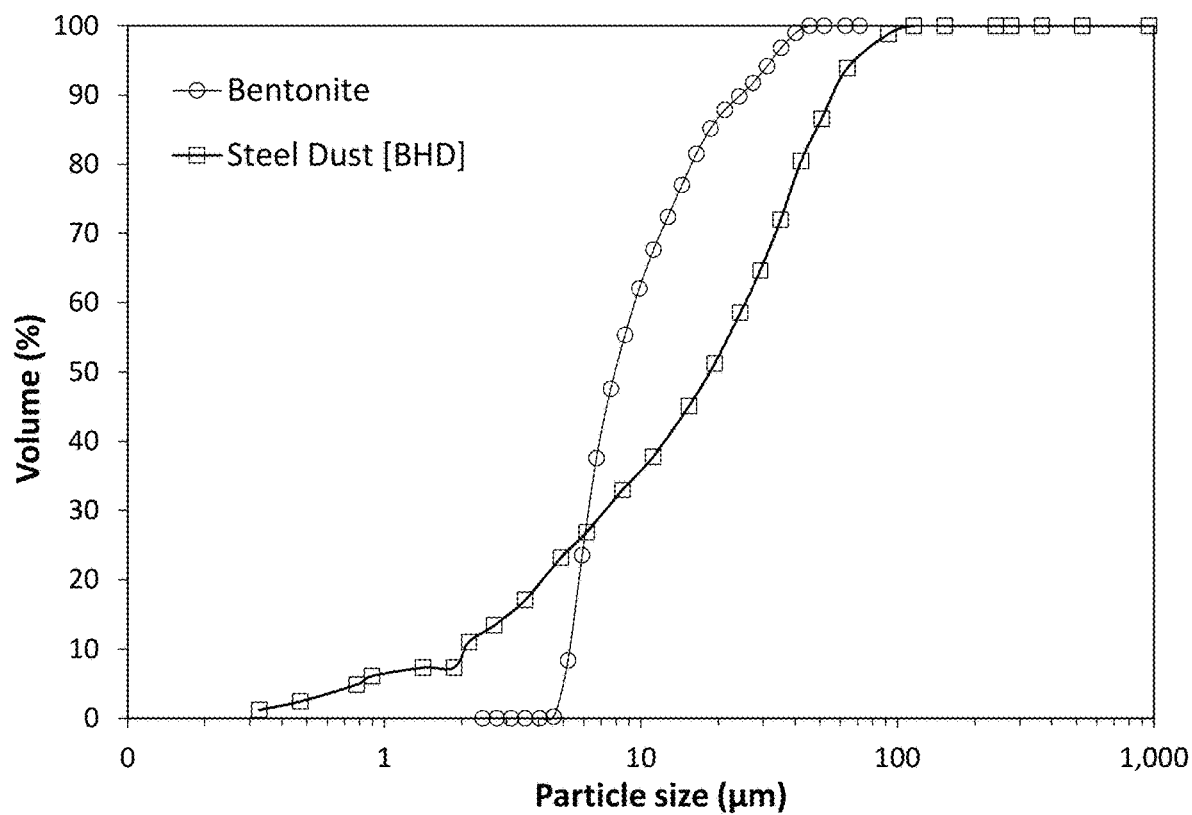
FIG. 5 is a graph of the cumulative volume versus particle size for bentonite and one type of steel dust.

FIGS. 4 and 5 provide the volume frequency versus particle size and the cumulative volume versus particle size for BHD and bentonite. The volume average particle size ($d_{50}$) was 19.6 μm for steel dust. For bentonite the volume average particle size ($d_{50}$) was 7.9 μm. The polydispersity index (PDI) was 1.7 for the steel dust and 1.5 for the bentonite.

Example 3

As mentioned above, the rheological properties of a drilling fluid are important. Thus, the viscosity, yield point, and other rheological properties were determined for fluid samples formed by blending the bentonite with water and then substituting steel dust (BHD) for part of the bentonite. Specifically, the samples were prepared at room temperature (in the range of 18° C. to 25° C.) by adding bentonite and steel dust in different ratios to 350 ml of distilled water while stirring in a mud mixer (FANN 205966 Hamilton Beach Mixer) for 2 minutes. After addition of the bentonite and optional steel dust (BHD), stirring continued for 20 minutes with any powder at the wall of the container being scraped using a spatula every 5 min to make sure that all of the powder was suspended in the mixture. The bentonite and steel dust mixture in water was aged for 16 hours at room temperature. At the end of the aging period, and before analysis, samples were stirred for 5 minutes for conditioning. The samples tested were 100 wt % bentonite, 80 wt % bentonite/20 wt % steel dust, and 70 wt % bentonite/30 wt % steel dust, where the steel dust was the BHD.

To determine apparent viscosity, plastic viscosity, and yield point, a Fan viscometer (Direct-indicating viscometer FAN-35) was used at room temperature (in the range of 18° C. to 25° C.) following the API standard procedures. For the Direct-indicating viscometer test, the rotational speed varied from 600 rpm to 3 rpm and this allows for calculation of the apparent viscosity, plastic viscosity, and yield points based on a method provided by the American Petroleum Institute, *API 13A Specification for drilling fluid materials*. 5$^{th}$ ED, 1993.

Figure 6:
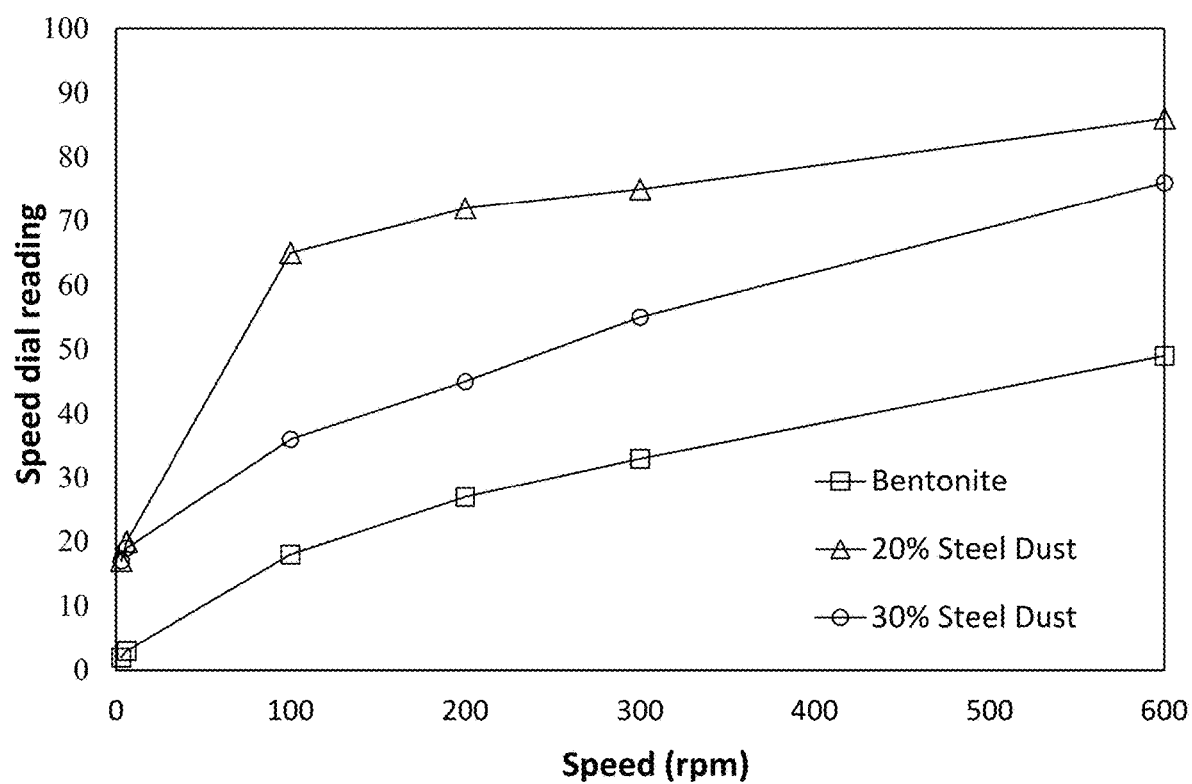
FIG. 6 is a graph of the raw data from a viscometer measurement for a fluid including bentonite and fluids including a combination of bentonite and steel dust that are non-limiting embodiments of the present invention.
Figure 7:
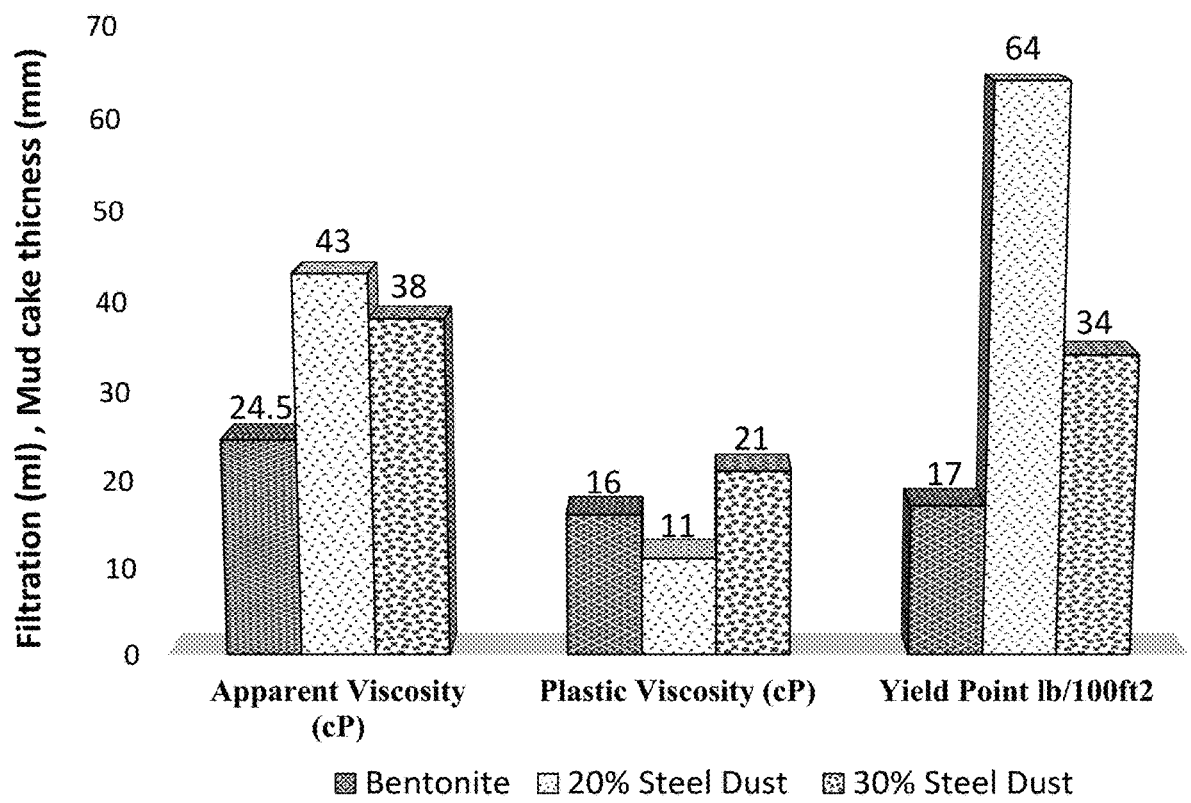
FIG. 7 is a bar chart of the apparent viscosity, plastic viscosity, and yield point derived from the viscometer measurement shown in FIG. 7 for a fluid including bentonite and fluids including a combination of bentonite and steel dust that are non-limiting embodiments of the present invention.

The results are shown in FIGS. 6 and 7. The structure of the mixture seems to be enforced by the presence of the steel dust (BHD) despite of using less bentonite amount, indicated by higher apparent viscosity and higher yield point.

Samples were also tested for the rheology as a function of shear rate. An Anton Paar Rheometer (Model MCR 302) with concentric cylinder configuration was used to measure the rheology for samples of 6 wt % solids added to distilled water, where the solids added were either all bentonite, or a combination of steel dust and bentonite ranging from 0% steel dust (100% bentonite) to 50% steel dust (with 50% being bentonite). The viscosity over the shear rate range from $1\ s^{-1}$ to $1000\ s^{-1}$ was measured used at room temperature (in the range of 18° C. to 25° C.).

Figure 8:
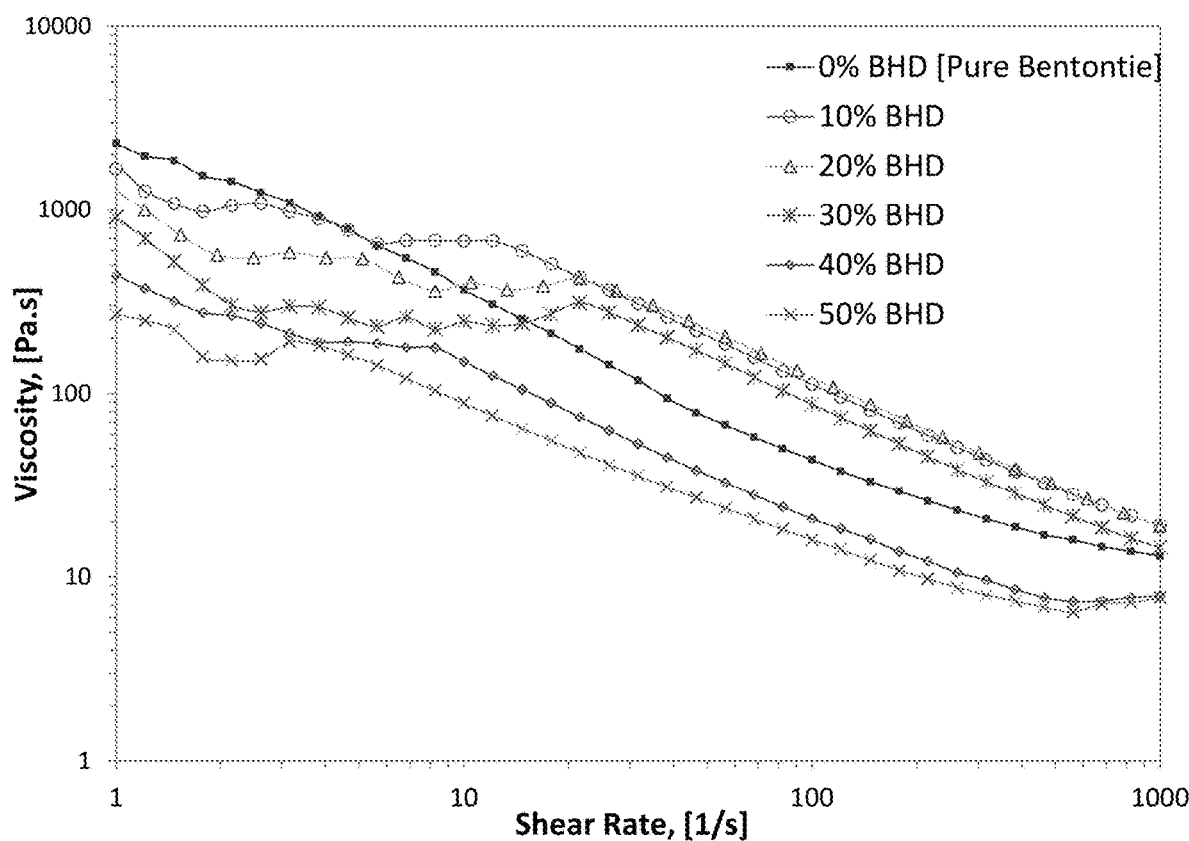
FIG. 8 is the viscosity as a function of shear rate a fluid including bentonite and fluids including a combination of bentonite and steel dust that are non-limiting embodiments of the present invention.
Figure 9:
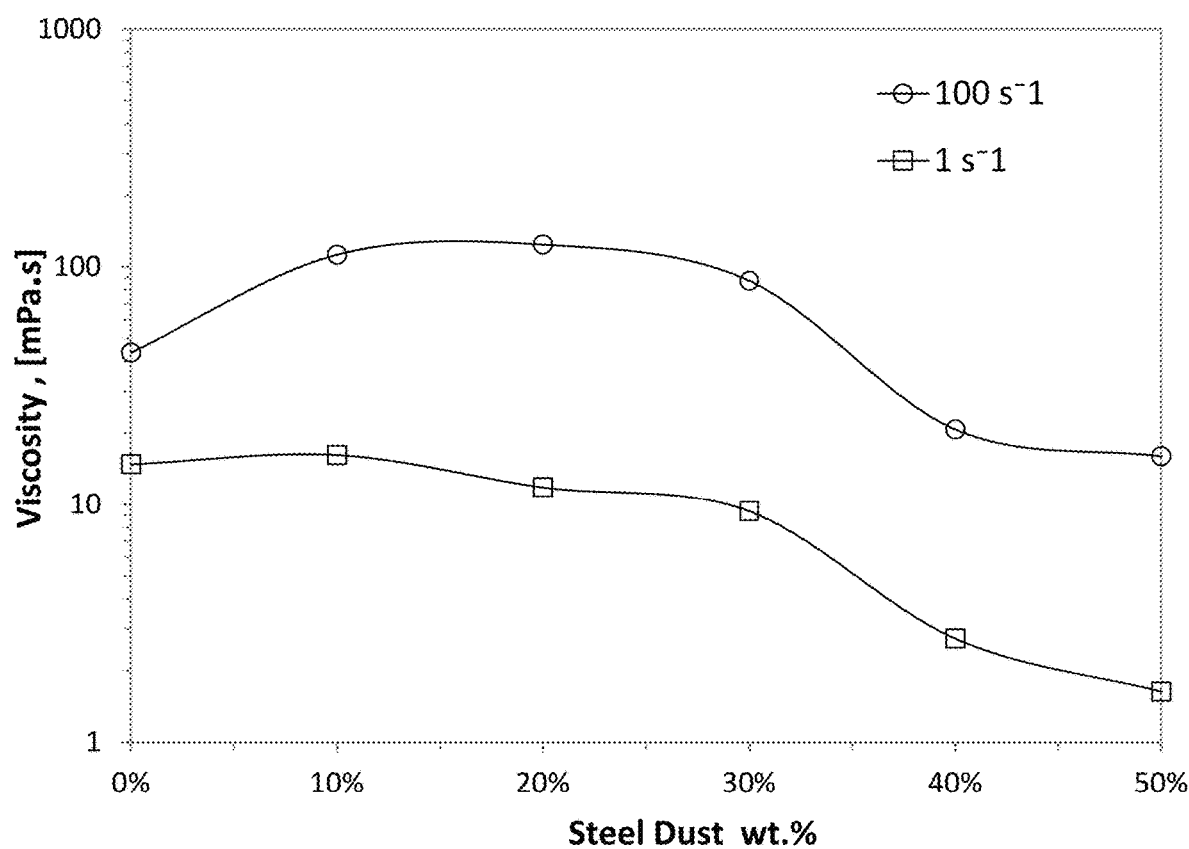
FIG. 9 is the viscosity as a function of % steel dust in the fluid including bentonite and in the fluids including a combination of bentonite and steel dust, that are non-limiting embodiments of the present invention, for two shear rates.

The results are shown in FIGS. 8 and 9. As seen in FIGS. 8 and 9, for a constant total solid content in the fluid of 6 wt %, the substitution of steel dust (BHD) for some of the bentonite increased the viscosity of the drilling fluid up to 30 wt % of the bentonite, then the effect is reversed. This indicates that a maximum of 30 wt % steel dust in mixtures with bentonite is preferred.

The storage and loss moduli (G' and G", respectively) were determined from a dynamic sweep test using an Anton Paar Rheometer with a constant oscillation amplitude (at the maximum strain in the linear viscoelastic region of 0.1%) over a range of oscillation frequencies (0.1 to 100 rad/s) (shear rate) at room temperature (in the range of 18° C. to 25° C.) for fluids with 100% bentonite or 70% bentonite/ 30% steel dust (BHD). The measurement was carried out at a strain (oscillation amplitude) below the critical strain. The critical strain was determined from a strain sweep test that had been previously conducted to ensure that the rheological behavior of the samples during the test is independent of imposed stress or strain levels.

Figure 10:
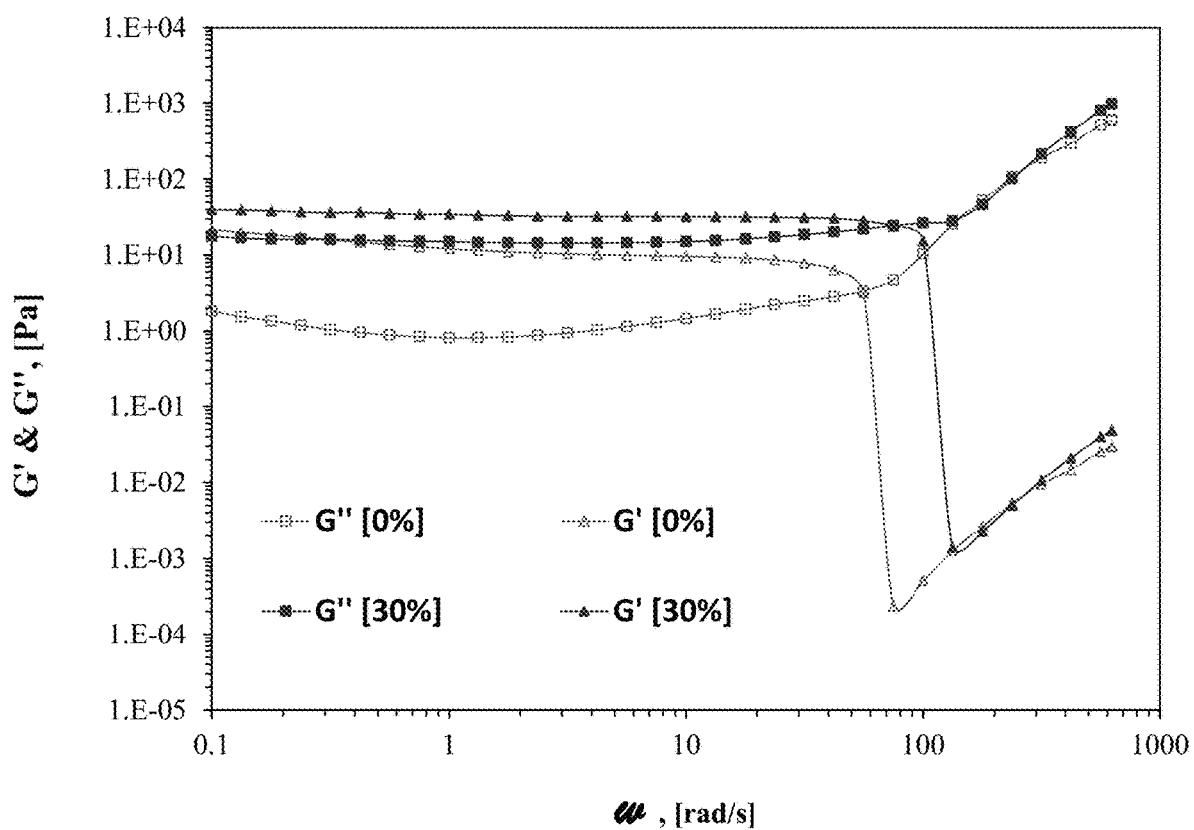
FIG. 10 is a graph of the complex and loss moduli for a fluid with only bentonite solids and a fluid of a combination of 70 wt % bentonite and 30 wt % steel dust, a non-limiting embodiment of the present invention.

The results are shown in FIG. 10. The results showed that the structure of bentonite suspension is increased by an order of magnitude in terms of storage and loss modulus as replacement of steel dust (BHD) in ratio of 30 wt % to bentonite.

Example 4

One way of evaluating drilling fluid quality is the low pressure/low temperature API filtration test using a low-temperature/low-pressure API filter press with a cell inside diameter of 76.2 mm (3 in), a height of 64.0 mm (2.5 in), and a filtration area of 45.8 cm$^2$ (7.1 in$^2$). The samples were prepared by mixing with the same procedure used in Example 3. As described in Example 3, after adding 22.5 gm of bentonite/steel dust to 350 ml distilled water and mixing for 2 minutes, the samples were further mixed for 20 minutes, and subsequently aged for 16 hours, and finally, after aging, mixed for 5 minutes prior to analysis. The samples ranged from 0% steel dust (100% bentonite) to 30 wt % steel dust (70 wt % bentonite).

Figure 11:
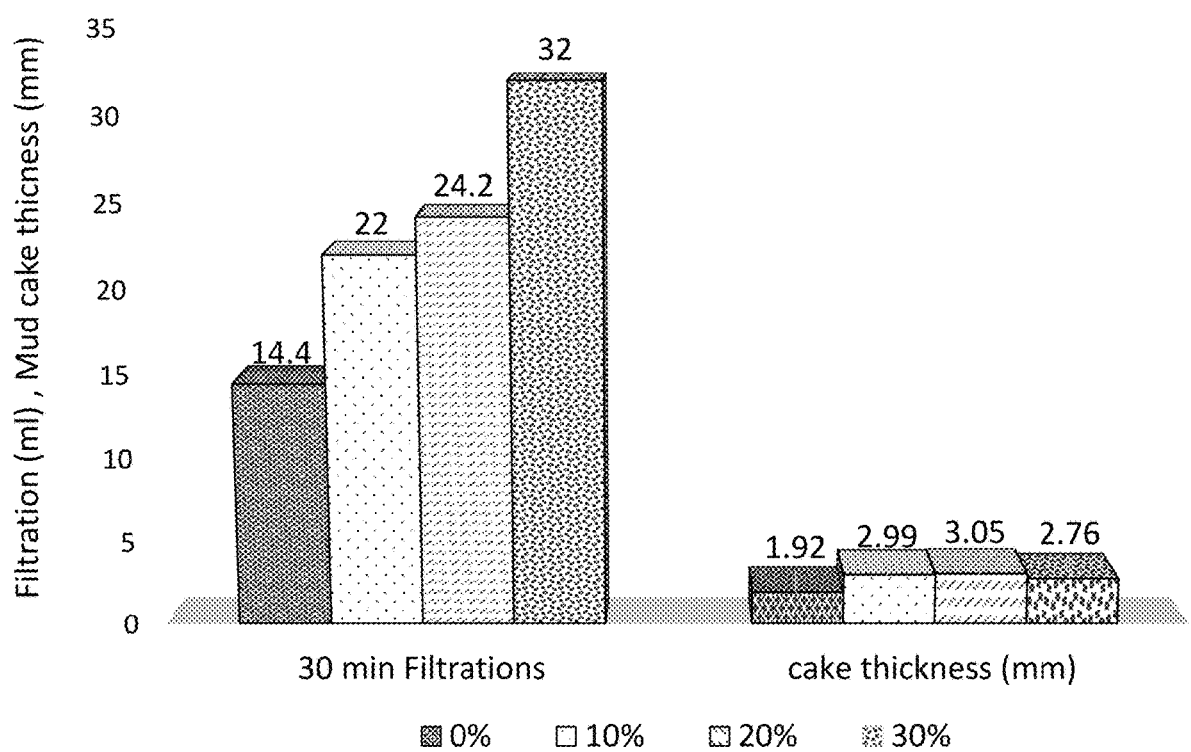
FIG. 11 exhibits the results of the API filtration test for a fluid including bentonite and for fluids including a combination of bentonite and steel dust that are non-limiting embodiments of the present invention.

The results are shown in FIG. 11. As seen in FIG. 11, filtration rates were higher for the mixtures of bentonite and steel dust. On the other hand, the mud cake formulated on the wellbore wall was not increasing with the increased steel dust and remained around 3 mm. The about 3 mm thickness of the mud cake is very good for preventing the drill pipe from getting stuck due to tight spots in borehole inside diameter.

Example 5

The order of mixing has great effect on the properties of the suspension. Since the swelling is mainly due to water absorption, the mixture is observed to have better viscosities if bentonite is dispersed first, and allowed to hydrate a minimum of 5 to 10 minutes after dispersion before the addition of the steel dust (or a composition including steel dust). When steel dust was added first to the liquid, followed by addition of bentonite, the mixture exhibited lower viscosities of 6 cP at both 10% and 20% steel dust, and higher water filtration of 42 ml for 10% BHD and 114 ml for 20% BHD, at the same weight percentages of solids that resulted in the best properties when the mixture is prepared by adding bentonite first.

While particular embodiments of the present invention have been shown and described, it will be obvious to those skilled in the art that changes and modifications can be made without departing from this invention in its broader aspects. Therefore, the claims are to encompass within their scope all such changes and modifications as fall within the true sprit and scope of this invention. Moreover, although individual aspects or features may have been presented with respect to one embodiment, a recitation of an aspect for one embodiment, or the recitation of an aspect in general, is intended to disclose its use in all embodiments in which that aspect or feature can be incorporated without undue experimentation. Also, embodiments of the present invention specifically encompass embodiments resulting from treating any dependent claim that follows as alternatively written in a multiple dependent form from all prior claims that possess all antecedents referenced in such dependent claim (e.g. each claim depending directly from claim 1 should be alternatively taken as depending from any previous claims).

What is claimed is:

1. A method of making a fluid for use in well-bore, the method comprising:
    forming a blend comprising one or more clays and one or more liquids;
    after forming the blend, adding steel dust or a composition comprising steel dust to the blend comprising the one or more clays and the one or more liquids;
    after adding the steel dust or the composition comprising steel dust, mixing the blend with the added steel dust for a first time period to form the fluid;
    after the first time period, aging the fluid comprising the one or more clays, steel dust, and the one or more liquids for a second time period;
    after the second time period, mixing the fluid comprising the one or more clays, steel dust, and the one or more liquids for a third time period.

2. The method of claim 1, wherein aging comprises allowing the blend to sit quiescently at a temperature in the range of 19° C. to 25° C. and a pressure of 1013.25 mbar (±150 mbar).

3. The method of claim 1, wherein forming the blend comprises comprising mixing the one or more clays, the one or more liquids, and, one or more first additives, for a fourth time period.

4. The method of claim 1, wherein the first time period is in the range of 30 seconds to 45 minutes, the second time period is in the range of 0.5 hour to 72 hours, the third time period is in the range of 30 seconds to 120 minutes, and the fourth time period is in the range of 5 seconds to 120 minutes.

5. The method of claim 1, wherein one or more first additives are present in the formed blend comprising the one or more clays and the one or more liquids.

6. The method of claim 1, wherein steel dust is added.

7. The method of claim 1, wherein a composition comprising steel dust is added, the composition also comprising one or more second additives.

8. A fluid comprising a combination of solids and one or more liquids, the solids comprising:
    one or more clays;
    one or more optional additives;
    and steel dust, the steel dust comprising:
        calcium oxide; and
        iron, one or more oxides of iron, or both iron and one or more oxides of iron;
        wherein at least 10 wt % of the steel dust is calcium oxide.

9. The fluid of claim 8, wherein % solids in the fluid is in the range of 0.25 wt % to 35 wt %.

10. The fluid of claim 8, wherein the sum of the wt % of the one or more clays and the wt % steel dust is at least 50 wt % of the solids.

11. The fluid of claim 8, wherein the weight to weight ratio of steel dust to the one or more clays is in the range of 1:500 to 9:1.

12. The fluid of claim 8, wherein the weight to weight ratio of steel dust to the one or more clays is in the range of 1:200 to 7:20.

13. The fluid of claim 8, wherein the sum of the wt % calcium oxide, the wt % iron, and the wt % oxides of iron is at least 50 wt % of the solids of the fluid.

14. The fluid of claim 8, wherein at least 20 wt % of the steel dust is calcium oxide.

15. The fluid of claim 8, wherein the sum of the wt % iron and the wt % of the oxides of iron is at least 35 wt % of the steel dust.

16. The fluid of claim 8, wherein the zeta potential of the steel dust at 150 mg/liter in distilled water is less than −20 mV at a pH in the range of 9 to 11, the turbidity of the steel dust at 150 mg/liter in distilled water is at least 150 NTU when the pH is in the range of 7 to 11, or both.

17. The fluid of claim 8, wherein, for the steel dust, the weight to weight ratio of the calcium oxide to the iron, one or more oxides of iron, or both iron and one or more oxides of iron is in the range of 1:9 to 9:1.

18. The fluid of claim 8, wherein, for the steel dust, the weight to weight ratio of the calcium oxide to the iron, one or more oxides of iron, or both iron and one or more oxides of iron is in the range of 9:11 to 11:9.

19. The fluid of claim 8, wherein volume average particle diameter of the steel dust added is in the range of 10-30 μm.

20. The fluid of claim 8, having an apparent viscosity of at least 30 cP, having a plastic viscosity of not more than 22 cP, having a yield point of at least 25 lb/100 ft$^2$, or any combination thereof.

* * * * *